US008229265B2

(12) United States Patent
Solheid et al.

(10) Patent No.: US 8,229,265 B2
(45) Date of Patent: Jul. 24, 2012

(54) FIBER DISTRIBUTION HUB WITH MULTIPLE CONFIGURATIONS

(75) Inventors: James J. Solheid, Lakeville, MN (US); Trevor D. Smith, Eden Prairie, MN (US); Matthew Holmberg, Le Center, MN (US); Nick Maaske, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 791 days.

(21) Appl. No.: 12/276,005

(22) Filed: Nov. 21, 2008
(Under 37 CFR 1.47)

(65) Prior Publication Data
US 2009/0263096 A1 Oct. 22, 2009

Related U.S. Application Data

(60) Provisional application No. 61/003,955, filed on Nov. 21, 2007, provisional application No. 60/990,609, filed on Nov. 27, 2007.

(51) Int. Cl.
*G02B 6/00* (2006.01)
(52) U.S. Cl. ......... 385/135; 385/134; 385/137; 385/139
(58) Field of Classification Search ........................ None
See application file for complete search history.

(56) References Cited

U.S. PATENT DOCUMENTS

| 4,736,100 | A | 4/1988 | Vastagh |
| 4,747,020 | A | 5/1988 | Brickley et al. |
| 4,792,203 | A | 12/1988 | Nelson et al. |
| 4,824,196 | A | 4/1989 | Bylander |
| 4,861,134 | A | 8/1989 | Alameel et al. |
| 4,900,123 | A | 2/1990 | Barlow et al. |
| 4,948,220 | A | 8/1990 | Violo et al. |
| 4,995,688 | A | 2/1991 | Anton et al. |
| 5,023,646 | A | 6/1991 | Ishida et al. |
| 5,069,636 | A | 12/1991 | Shimirak et al. |
| 5,073,042 | A | 12/1991 | Mulholland et al. |
| 5,076,688 | A | 12/1991 | Bowen et al. |
| 5,109,467 | A | 4/1992 | Hogan et al. |

(Continued)

FOREIGN PATENT DOCUMENTS

| DE | 9105800 U1 | 6/1991 |
| DE | 103 07 944 A1 | 9/2004 |

(Continued)

OTHER PUBLICATIONS

Copending and coassigned Reagan et al., U.S. Appl. No. 11/699,716, *Optical Communication Signal Distribution Enclosure*, filed Jan. 29, 2007.

(Continued)

*Primary Examiner* — Charlie Peng
*Assistant Examiner* — Mary El Shammaa
(74) *Attorney, Agent, or Firm* — Merchant & Gould P.C.

(57) ABSTRACT

A fiber distribution hub (FDH) includes an enclosure and brackets with provisions to be mountable in multiple configurations. More particularly, the FDH is mountable in multiple configurations to a pole. The FDH includes provisions to be reconfigurable within the enclosure. More particularly, a hinged storage panel is reconfigurable between a horizontal hinging configuration and a vertical hinging configuration. A door is provided on the enclosure with features to stop and hold the door in one or more open positions. A ladder bracket is provided that is configurable as a ladder support or as an FDH mounting bracket.

21 Claims, 28 Drawing Sheets

U.S. PATENT DOCUMENTS

| | | | |
|---|---|---|---|
| 5,142,598 | A | 8/1992 | Tabone |
| 5,214,735 | A | 5/1993 | Henneberger et al. |
| 5,233,674 | A | 8/1993 | Vladic |
| 5,274,729 | A | 12/1993 | King et al. |
| 5,274,731 | A | 12/1993 | White |
| 5,317,663 | A | 5/1994 | Beard et al. |
| 5,333,221 | A | 7/1994 | Briggs et al. |
| 5,333,222 | A | 7/1994 | Belenkiy et al. |
| 5,359,688 | A | 10/1994 | Underwood |
| 5,363,465 | A | 11/1994 | Korkowski et al. |
| 5,367,598 | A | 11/1994 | Devenish, III et al. |
| 5,402,515 | A | 3/1995 | Vidacovich et al. |
| 5,408,557 | A | 4/1995 | Hsu |
| RE34,955 | E | 5/1995 | Anton et al. |
| 5,420,958 | A | 5/1995 | Henson et al. |
| 5,442,726 | A | 8/1995 | Howard et al. |
| 5,448,015 | A | 9/1995 | Jamet et al. |
| 5,469,526 | A | 11/1995 | Rawlings |
| 5,497,444 | A | 3/1996 | Wheeler |
| 5,506,922 | A | 4/1996 | Grois et al. |
| 5,511,144 | A | 4/1996 | Hawkins et al. |
| 5,542,015 | A | 7/1996 | Hultermans |
| 5,636,138 | A | 6/1997 | Gilbert et al. |
| 5,647,043 | A | 7/1997 | Anderson et al. |
| 5,708,751 | A | 1/1998 | Mattei |
| 5,717,810 | A | 2/1998 | Wheeler |
| 5,734,774 | A | 3/1998 | Morrell |
| 5,734,776 | A | 3/1998 | Puetz |
| 5,758,003 | A | 5/1998 | Wheeler et al. |
| 5,764,844 | A | 6/1998 | Mendes |
| 5,774,612 | A | 6/1998 | Belenkiy et al. |
| 5,778,132 | A | 7/1998 | Csipkes et al. |
| 5,823,646 | A | 10/1998 | Arizpe et al. |
| 5,825,955 | A | 10/1998 | Ernst et al. |
| 5,828,807 | A | 10/1998 | Tucker et al. |
| 5,883,995 | A | 3/1999 | Lu |
| 5,909,526 | A | 6/1999 | Roth et al. |
| 5,930,425 | A | 7/1999 | Abel et al. |
| 5,945,633 | A | 8/1999 | Ott et al. |
| 5,956,444 | A | 9/1999 | Duda et al. |
| 5,969,294 | A | 10/1999 | Eberle et al. |
| 5,975,769 | A | 11/1999 | Larson et al. |
| 5,982,972 | A | 11/1999 | Tucker et al. |
| 6,027,252 | A | 2/2000 | Erdman et al. |
| 6,041,155 | A | 3/2000 | Anderson et al. |
| 6,044,193 | A | 3/2000 | Szentesi et al. |
| 6,061,492 | A | 5/2000 | Strause et al. |
| 6,069,797 | A | 5/2000 | Widmayer et al. |
| 6,079,881 | A | 6/2000 | Roth |
| 6,096,797 | A | 8/2000 | Prantl et al. |
| 6,149,315 | A | 11/2000 | Stephenson |
| 6,160,946 | A | 12/2000 | Thompson et al. |
| 6,188,687 | B1 | 2/2001 | Mussman et al. |
| 6,188,825 | B1 | 2/2001 | Bandy et al. |
| 6,208,796 | B1 | 3/2001 | Williams Vigliaturo |
| 6,227,717 | B1 | 5/2001 | Ott et al. |
| 6,234,683 | B1 | 5/2001 | Waldron et al. |
| 6,236,795 | B1 | 5/2001 | Rodgers |
| 6,240,229 | B1 | 5/2001 | Roth |
| 6,247,849 | B1 | 6/2001 | Liu |
| 6,259,850 | B1 | 7/2001 | Crosby, Jr. et al. |
| 6,271,484 | B1 | 8/2001 | Tokutsu |
| 6,278,829 | B1 | 8/2001 | BuAbbud et al. |
| RE37,489 | E | 1/2002 | Anton et al. |
| 6,347,888 | B1 | 2/2002 | Puetz |
| 6,356,697 | B1 | 3/2002 | Braga et al. |
| 6,363,200 | B1 | 3/2002 | Thompson et al. |
| 6,383,034 | B1 | 5/2002 | Blake et al. |
| 6,385,381 | B1 | 5/2002 | Janus et al. |
| 6,411,767 | B1 | 6/2002 | Burrous et al. |
| 6,418,262 | B1 | 7/2002 | Puetz et al. |
| 6,424,781 | B1 | 7/2002 | Puetz et al. |
| 6,425,694 | B1 | 7/2002 | Szilagyi et al. |
| 6,431,762 | B1 | 8/2002 | Taira et al. |
| 6,434,313 | B1 | 8/2002 | Clapp, Jr. et al. |
| 6,452,925 | B1 | 9/2002 | Sistanizadeh et al. |
| 6,453,033 | B1 | 9/2002 | Little et al. |
| 6,464,402 | B1 | 10/2002 | Andrews et al. |
| D466,087 | S | 11/2002 | Cuny et al. |
| 6,480,487 | B1 | 11/2002 | Wegleitner et al. |
| 6,483,977 | B2 | 11/2002 | Battey et al. |
| 6,496,640 | B1 | 12/2002 | Harvey et al. |
| 6,535,682 | B1 | 3/2003 | Puetz et al. |
| 6,539,147 | B1 | 3/2003 | Mahony |
| 6,539,160 | B2 | 3/2003 | Battey et al. |
| 6,542,688 | B1 | 4/2003 | Battey et al. |
| 6,554,485 | B1 | 4/2003 | Beatty et al. |
| 6,556,763 | B1 | 4/2003 | Puetz et al. |
| 6,577,595 | B1 | 6/2003 | Counterman |
| 6,591,051 | B2 | 7/2003 | Solheid et al. |
| 6,597,670 | B1 | 7/2003 | Tweedy et al. |
| 6,614,980 | B1 | 9/2003 | Mahony |
| 6,621,975 | B2 | 9/2003 | Laporte et al. |
| 6,623,170 | B2 | 9/2003 | Petrillo |
| 6,625,375 | B1 | 9/2003 | Mahony |
| 6,631,237 | B2 | 10/2003 | Knudsen et al. |
| 6,654,536 | B2 | 11/2003 | Battey et al. |
| 6,661,961 | B1 | 12/2003 | Allen et al. |
| 6,668,127 | B1 | 12/2003 | Mahony |
| 6,678,457 | B2 | 1/2004 | Kim et al. |
| 6,715,719 | B2 | 4/2004 | Nault et al. |
| 6,721,484 | B1 | 4/2004 | Blankenship et al. |
| 6,760,531 | B1 | 7/2004 | Solheid et al. |
| 6,768,860 | B2 | 7/2004 | Liberty |
| 6,778,752 | B2 | 8/2004 | Laporte et al. |
| 6,788,786 | B1 | 9/2004 | Kessler et al. |
| 6,792,190 | B2 | 9/2004 | Xin et al. |
| 6,792,191 | B1 | 9/2004 | Clapp, Jr. et al. |
| 6,815,612 | B2 | 11/2004 | Bloodworth et al. |
| 6,845,207 | B2 | 1/2005 | Schray |
| 6,850,685 | B2 | 2/2005 | Tinucci et al. |
| 6,853,795 | B2 | 2/2005 | Dagley et al. |
| 6,870,734 | B2 | 3/2005 | Mertesdorf et al. |
| 6,901,200 | B2 | 5/2005 | Schray |
| 6,909,833 | B2 | 6/2005 | Henschel et al. |
| 6,920,213 | B2 | 7/2005 | Pershan |
| 6,920,274 | B2 | 7/2005 | Rapp et al. |
| 6,925,241 | B2 | 8/2005 | Bohle et al. |
| 6,950,593 | B2 | 9/2005 | Hodge et al. |
| 6,980,725 | B1 | 12/2005 | Swieconek |
| 6,983,095 | B2 | 1/2006 | Reagan et al. |
| 7,029,322 | B2 | 4/2006 | Ernst et al. |
| 7,086,539 | B2 | 8/2006 | Knudsen et al. |
| 7,088,899 | B2 | 8/2006 | Reagan et al. |
| 7,103,255 | B2 | 9/2006 | Reagan et al. |
| 7,139,461 | B2 | 11/2006 | Puetz et al. |
| 7,142,764 | B2 | 11/2006 | Allen et al. |
| 7,146,089 | B2 | 12/2006 | Reagan et al. |
| 7,149,398 | B2 | 12/2006 | Solheid et al. |
| 7,171,102 | B2 | 1/2007 | Reagan et al. |
| 7,194,181 | B2 | 3/2007 | Holmberg et al. |
| 7,198,409 | B2 | 4/2007 | Smith et al. |
| 7,200,317 | B2 * | 4/2007 | Reagan et al. ............. 385/139 |
| 7,218,827 | B2 | 5/2007 | Vongseng et al. |
| 7,228,036 | B2 | 6/2007 | Elkins, II et al. |
| 7,233,731 | B2 | 6/2007 | Solheid et al. |
| 7,245,809 | B1 * | 7/2007 | Gniadek et al. ............. 385/135 |
| 7,277,620 | B2 | 10/2007 | Vongseng et al. |
| 7,298,952 | B2 | 11/2007 | Allen et al. |
| 7,333,707 | B2 | 2/2008 | Puetz et al. |
| 7,340,146 | B2 | 3/2008 | Lampert et al. |
| 7,346,254 | B2 | 3/2008 | Kramer et al. |
| 7,369,741 | B2 * | 5/2008 | Reagan et al. ............. 385/139 |
| 7,376,322 | B2 | 5/2008 | Zimmel et al. |
| 7,376,323 | B2 | 5/2008 | Zimmel |
| 7,400,813 | B2 | 7/2008 | Zimmel |
| 7,400,816 | B2 | 7/2008 | Reagan et al. |
| 7,407,330 | B2 | 8/2008 | Smith et al. |
| 7,416,349 | B2 | 8/2008 | Kramer |
| 7,418,181 | B2 | 8/2008 | Zimmel et al. |
| 7,419,384 | B2 | 9/2008 | Neumetzler et al. |
| 7,457,503 | B2 | 11/2008 | Solheid et al. |
| 7,471,869 | B2 | 12/2008 | Reagan et al. |
| 7,492,575 | B2 | 2/2009 | Irmer et al. |
| 7,515,805 | B2 | 4/2009 | Vongseng et al. |
| 7,519,259 | B2 | 4/2009 | Smith et al. |
| 2001/0001270 | A1 | 5/2001 | Williams Vigliaturo |

| | | | |
|---|---|---|---|
| 2002/0034290 A1 | 3/2002 | Pershan | |
| 2002/0150372 A1 | 10/2002 | Schray | |
| 2002/0176681 A1 | 11/2002 | Puetz et al. | |
| 2003/0113086 A1 | 6/2003 | Jun et al. | |
| 2003/0165315 A1 | 9/2003 | Trebesch et al. | |
| 2003/0174996 A1 | 9/2003 | Henschel et al. | |
| 2003/0207601 A1 | 11/2003 | Adachi | |
| 2004/0074852 A1 | 4/2004 | Knudsen et al. | |
| 2004/0165852 A1 | 8/2004 | Erwin et al. | |
| 2004/0228598 A1 | 11/2004 | Allen et al. | |
| 2005/0013768 A1 | 1/2005 | Malhotra et al. | |
| 2005/0135768 A1 | 6/2005 | Rapp et al. | |
| 2005/0163448 A1 | 7/2005 | Blackwell, Jr. et al. | |
| 2005/0281526 A1 | 12/2005 | Vongseng et al. | |
| 2006/0003637 A1 | 1/2006 | Neumetzler et al. | |
| 2006/0008231 A1 | 1/2006 | Reagan et al. | |
| 2006/0083475 A1 | 4/2006 | Grubish et al. | |
| 2006/0093301 A1 | 5/2006 | Zimmel et al. | |
| 2006/0115220 A1 | 6/2006 | Elkins, II et al. | |
| 2006/0177190 A1 | 8/2006 | Vongseng et al. | |
| 2006/0204200 A1 | 9/2006 | Lampert et al. | |
| 2006/0228086 A1 | 10/2006 | Holmberg et al. | |
| 2006/0269205 A1 | 11/2006 | Zimmel | |
| 2006/0269206 A1 | 11/2006 | Zimmel | |
| 2007/0031100 A1 | 2/2007 | Garcia et al. | |
| 2007/0033629 A1 | 2/2007 | McGranahan et al. | |
| 2007/0047893 A1 | 3/2007 | Kramer et al. | |
| 2007/0165995 A1 | 7/2007 | Reagan et al. | |
| 2007/0189691 A1 | 8/2007 | Barth et al. | |
| 2007/0192817 A1 | 8/2007 | Landry et al. | |
| 2008/0008436 A1 | 1/2008 | Reagan et al. | |
| 2008/0013910 A1 | 1/2008 | Reagan et al. | |
| 2008/0019644 A1 | 1/2008 | Smith et al. | |
| 2008/0019655 A1 | 1/2008 | Vongseng et al. | |
| 2008/0025684 A1 | 1/2008 | Vongseng et al. | |
| 2008/0031585 A1 | 2/2008 | Solheid et al. | |
| 2008/0042535 A1 | 2/2008 | Guzzo et al. | |
| 2008/0042536 A1 | 2/2008 | Guzzo et al. | |
| 2008/0075411 A1 | 3/2008 | Solheid et al. | |
| 2008/0079341 A1 | 4/2008 | Anderson et al. | |
| 2008/0080826 A1 | 4/2008 | Leon et al. | |
| 2008/0080827 A1 | 4/2008 | Leon et al. | |
| 2008/0080828 A1 | 4/2008 | Leon et al. | |
| 2008/0080829 A1 | 4/2008 | Smith et al. | |
| 2008/0124039 A1 | 5/2008 | Gniadek et al. | |
| 2008/0317425 A1 | 12/2008 | Smith et al. | |
| 2009/0022467 A1 | 1/2009 | Puetz et al. | |
| 2009/0074372 A1 | 3/2009 | Solheid et al. | |
| 2009/0087157 A1 | 4/2009 | Smith et al. | |
| 2009/0190896 A1 | 7/2009 | Smith et al. | |
| 2009/0196565 A1 | 8/2009 | Vongseng et al. | |
| 2009/0263096 A1* | 10/2009 | Solheid et al. | 385/135 |
| 2010/0209066 A1* | 8/2010 | Anderson et al. | 385/135 |
| 2011/0103760 A1* | 5/2011 | Cote et al. | 385/135 |

FOREIGN PATENT DOCUMENTS

| | | |
|---|---|---|
| EP | 0 743 701 A2 | 11/1996 |
| EP | 0 788 002 A1 | 8/1997 |
| EP | 0 871 047 A1 | 10/1998 |
| EP | 0 975 180 A1 | 1/2000 |
| EP | 1 045 267 A1 | 10/2000 |
| EP | 1 692 556 | 8/2006 |
| JP | 63-229409 | 9/1988 |
| JP | 3307618 | 5/2002 |
| JP | 2005-222749 | 8/2005 |
| JP | 3761762 | 1/2006 |
| WO | WO 95/20175 | 7/1995 |
| WO | WO 98/53347 | 11/1998 |
| WO | WO 99/27404 | 6/1999 |
| WO | WO 00/52504 | 9/2000 |
| WO | WO 00/75706 A2 | 12/2000 |
| WO | WO 02/21182 A1 | 3/2002 |
| WO | WO 02/103429 A2 | 12/2002 |
| WO | WO 2004/032532 A2 | 4/2004 |
| WO | WO 2007/095037 A2 | 8/2007 |

OTHER PUBLICATIONS

Copending and coassigned Reagan et al., U.S. Appl. No. 12/426,723, *Parking in Fiber Distribution Hubs*, filed Apr. 20, 2009.

Copending and coassigned Reagan et al., U.S. Appl. No. 12/435,170, *Fiber Distribution Hub*, filed May 4, 2009.

Copending and coassigned Reagan et al., U.S. Appl. No. 12/435,181, *Fiber Distribution Device*, filed May 4, 2009.

Copending and coassigned Reagan et al., U.S. Appl. No. 12/603,412, *Fiber Distribution Hubs with Swing Frame Chassis*, filed Oct. 21, 2009.

Fiber Distribution Hub ACE-102V Pole-Mount Cabinet Installation Instructions, ADCP-96-008, Issue 2, ADC Telecommunications, Inc., pp. 1-31 (Dec. 2004).

OmniReach™ FONS Fiber Distribution Hub Pole-Mount Kit Installation Instructions, ADCP-96-116, Issue 3, ADC Telecommunications, Inc., pp. 1-11 (Dec. 2006).

Pole Mounting Kits for the 4300 6U Outdoor Cabinet Installation Instructions, Document No. 4300-A2-ZZ49-00, Zhone Technologies, Inc., pp. 1-8 (Nov. 2005).

U.S. Appl. No. 12/338,586, filed Dec. 18, 2008 entitled "Multi-Configuration Mounting System for Fiber Distribution Hub".

24 photos of LambdaUnite® Blank Card; "LambdaUnite® MultiService Switch (MSS)" brochure (2003); and "Lucent's LambdaUnite® Busts Out" official release (Jan. 29, 2002).

Complaint relating to Civil Action No. 08-CV-02234-DWF-JSM, filed Jun. 13, 2008 (7 pages).

Complaint relating to Civil Action No. 08-CV-5222-RMK-JJK, filed Sep. 19, 2008 (8 pages).

Reagan et al.; U.S. Appl. No. 11/699,716; *Optical Communication Signal Distribution Enclosure*; filed Jan. 29, 2007.

U.S. Appl. No. 12/185,504, filed Aug. 4, 2008.

Brochure from Amphenol Corp. entitled "Amphenol® 954 Series one piece SC Connector," 2 pgs. (1990).

AMP Inc. catalog entitled "Fiber Optic Products," front and back covers and p. 59, (4 pgs.) (©1991).

HRS catalog entitled "Optical Fibre Connectors," front and back covers and pp. 16, 17 and 49 (5 pages) (Mar. 1991).

AT&T Network Systems catalog entitled "Fiber Optic Products Innovation for wide ranging applications," front and back covers and pp. 6-1 through 6-16 (18 pages) (©1995).

NTT Int'l Fiber Termination Module (FTM) & Premises Optical Distribution Cabinets (PODC) product brochure, 3 pages (Publicly known at least as early as Jun. 30, 2003).

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s OMX™ 600, Optical Distribution Frame Brochure; front cover, Table of Contents, pp. 1-14, and back cover; revised Feb. 2000, Item No. 854.

Iwano, S. et al., "MU-type Optical Fiber Connector System," *NTT Review*, vol. 9, No. 2, pp. 63-71 (Mar. 1997).

Sugita, E. et al., "SC-Type Single-Mode Optical Fiber Connectors," *Journal of Lightwave Technology*, vol. 7, No. 11, pp. 1689-1696 (Nov. 1989).

FONS Corporation's MDC Series Rack or Wall Mount Enclosures product sheet, 3 pages, (2002).

FONS Corporation's Modular Distribution Cabinets Rack Mount Enclosures, Model MDC-7, product sheet, 2 pages (2005) (shows the same device as shown in Exhibit L).

FONS Corporation's Technical Drawing No. 11669, Rev. D, of Distribution Cabinet Assembly MFDC-7, 1 page (technical drawing depicting the device shown in Exhibit M).

ADC Telecommunications, Inc.'s Secure Fiber Entrance Terminal (SFET) Brochure; front cover, pp. 2-7, and back cover; revised May 1998, Item No. 1005.

ADC Telecommunications, Inc.'s 2nd Edition of Fiber Panel Products; front cover, Table of Contents, pp. 1-111, and back cover; revised Jul. 1996, Item No. 846.

24-Fiber Wall-Mount Box FPL Duplex Adapters, ADC Telecommunications; Fiber Panel Products—Specialty Panels, Jul. 1996, p. 65.

FL1000—Customer Premises Fiber Distribution Products, ADC Telecommunications; © 1998, pp. 1-8.

FONS Small Termination Interconnect Cabinet; FONS® Fiber Optic Network Solutions, now part of ADC Telecommunications, Inc., FONS Corp. © 2005, 2 pages.

FONS LX-10 Series Cabinets, Wall Mount Enclosures, FONS® Fiber Optic Network Solutions, now part of ADC Telecommunications, Inc., FONS Corp. © 2005, pp. 1-3.

FONS Wall Mount Patch/Splice Enclosure, Indoor Wall Mount Terminals, FONS® Fiber Optic Network Solutions, now part of ADC Telecommunications, Inc., FONS Corp. © 2005, 1 page.

FONS TIC Series Cabinets, Indoor Wall Mount Terminals, FONS® Fiber Optic Network Solutions, now part of ADC Telecommunications, Inc., FONS Corp. © 2005, pp. 1-3.

Drawings showing an ADC fiber storage trough concept including presentation entitled "Fujitsu Fiber Management Project Fiber Trough Concept", 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

"Retainer Staright [sic] Removable SC," which shows a latch design, 2 pages (Jan. 17, 2006).

* cited by examiner

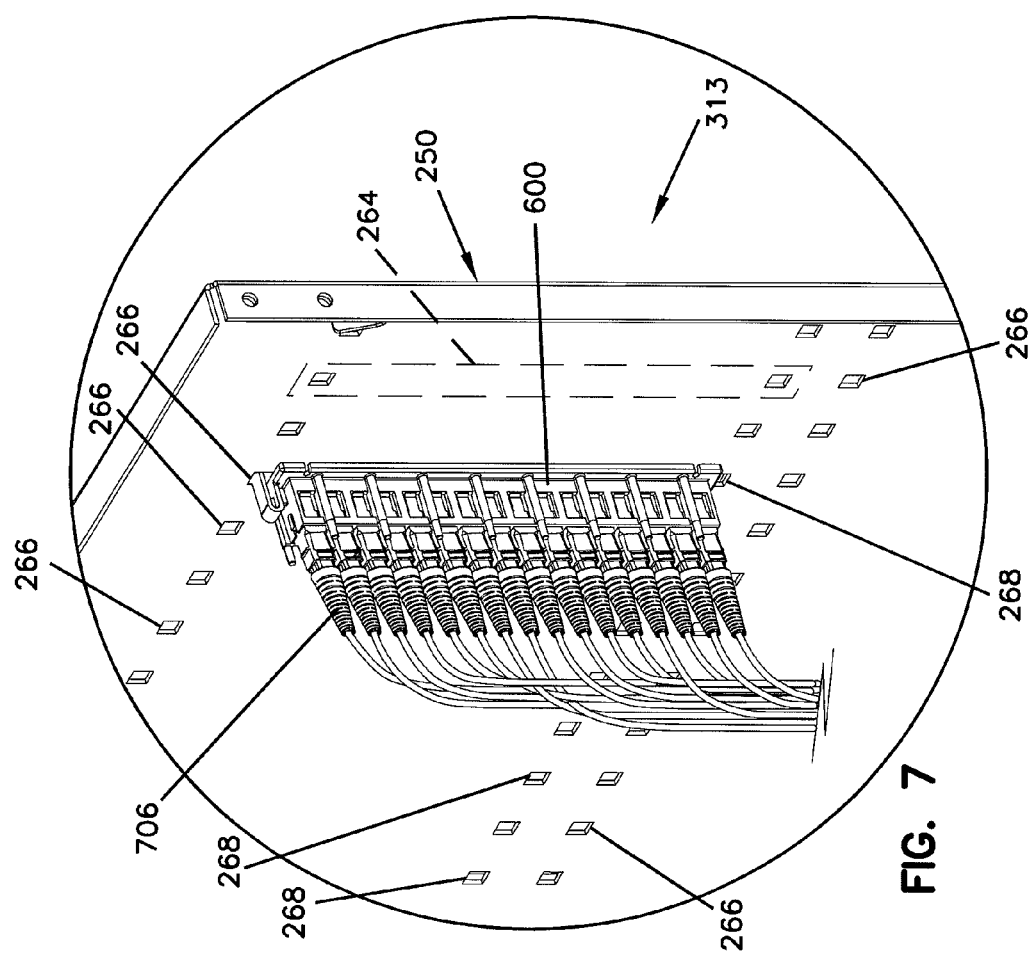
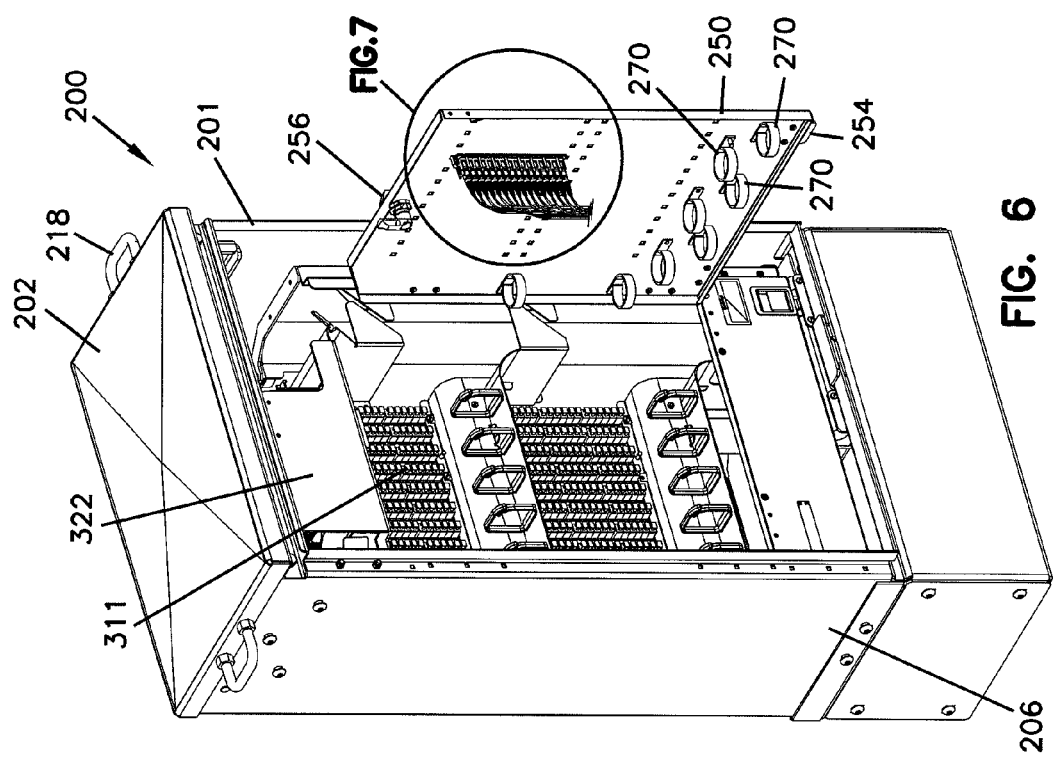

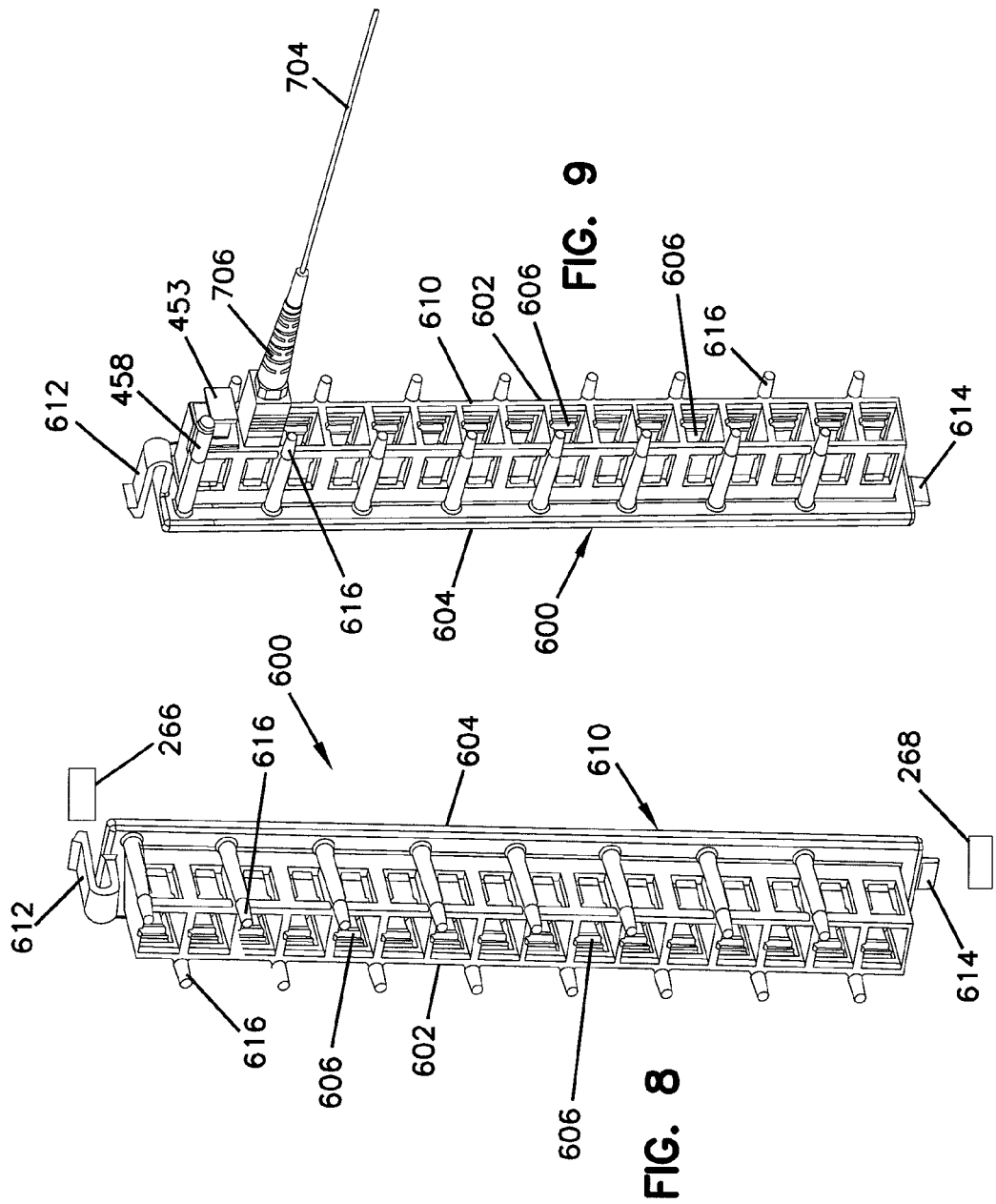

FIBER DISTRIBUTION HUB WITH MULTIPLE CONFIGURATIONS

CROSS REFERENCE TO RELATED APPLICATIONS

The present application claims the benefit of U.S. Provisional Patent Application Ser. No. 61/003,955, filed Nov. 21, 2007, and U.S. Provisional Patent Application Ser. No. 60/990,609, filed Nov. 27, 2007, which applications are hereby incorporated by reference in their entirety.

TECHNICAL FIELD

The principles disclosed herein relate to fiber optic cable and other cable distribution systems. More particularly, the present disclosure relates to distributing fiber optic cables and related signals within a network including provisions to reroute, add capacity to, and reduce capacity of the network.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown at FIG. 1, the network 100 may include a central office 110 that connects a number of end subscribers 115 (also called end users 115 herein) within the network 100. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network 100 can be aerial or housed within underground conduits (e.g., see conduit 105).

A portion of the network 100 that is closest to the central office 110 is generally referred to as an F1 region, where F1 is the "feeder fiber" from the central office 110. The F1 portion of the network 100 may include a distribution cable having on the order of 12 to 48 fibers; however, alternative implementations may include fewer or more fibers. A portion of the network 100 that includes at least one of the FDHs 130 and at least one of the end users 115 may be referred to as an F2 portion of the network 100. Splitters used in the typical FDH 130 may split incoming fibers of a feeder cable into, for example, 216 to 432 individual distribution fibers that may be associated with a like number of end user 115 locations.

Referring to FIG. 1, the network 100 includes a plurality of break-out locations 125 at which branch cables 122 are separated out from main cable lines 120. The break-out locations 125 can also be referred to as tap locations, drop cable locations, splice locations or branch locations. The branch cables 122 can also be referred to as drop cables, drop lines, break-out cables or stub cables. The branch cables 122 are often connected to drop terminals 104 that include connector interfaces for facilitating coupling the fibers of the branch cables 122 to a plurality of different subscriber locations 115. The branch cables 122 are also often connected to FDHs 130.

Within the FDH 130, incoming optical fibers, from the central office 110, can be connected to outgoing optical fibers, leading to the end users 115, forming an optical signal connection. Each of the incoming optical fibers may be split into multiple intermediate fibers. Each of these intermediate fibers may also be connected to one of the outgoing optical fibers, forming an optical signal connection. The optical signal connections can be reconfigured within the FDH 130. For example, a particular incoming fiber may be initially connected to a first outgoing fiber but may be disconnected and instead connected to a second outgoing fiber. Certain unused incoming fibers and/or intermediate fibers may not be connected to any of the outgoing fibers. There is a need to organize and store these unused incoming fibers and/or intermediate fibers in configurations convenient to specific applications. There is also a need for an FDH that provides organization and storage for incoming and intermediate fibers that is adaptable to multiple configurations, the configuration being selected based on the intended application. The FDH 130 may be mounted in various applications and locations. There is a need for the mounting of the FDH 130 to be adaptable to conveniently match various applications and locations. The present disclosure satisfies these and other needs.

SUMMARY

Certain aspects of the disclosure relate to fiber optic cable systems.

In example systems, a fiber optic distribution system includes one or more fiber distribution hubs (FDHs) that provide an interface between a central office and subscribers. The FDH contains terminated incoming fibers, coming from the central office, and terminated outgoing fibers, each going to one of the subscribers. The terminated outgoing fibers may be collected at a termination region within the FDH. One or more of the incoming fibers may be connected to an optical splitter within the FDH thereby coupling the incoming fiber to multiple intermediate fibers (e.g., connectorized pigtails). The incoming fibers and intermediate fibers may be selectively connected to the outgoing fibers within the FDH. One or more of the incoming fibers and/or the intermediate fibers may not be connected to any of the outgoing fibers but may instead be parked at a storage module.

The FDHs may be mounted in a variety of different locations and in a variety of different applications. For example, a common FDH mounting location is overhead on a mounting pole. The mounting pole may also carry an aerially suspended main fiber optic line with a branch line routed to the FDH. The FDH is accessed by a technician when it is necessary to establish and/or reconfigure optical connections within the FDH. For example, it may be desired to connect a particular intermediate fiber currently parked at one of the storage modules to a particular outgoing fiber. To reconfigure the optical connections within the FDH, the technician must gain access to the FDH. This may be done by climbing a ladder or the mounting pole itself in the case of the pole mounted FDH. Certain embodiments of the present disclosure provide a ladder bracket for securing the placement of the ladder. Upon reaching the FDH, a cabinet door of the FDH is opened exposing a storage panel. According to the present disclosure, the cabinet door is configured to automatically stop and hold at one or more intermediate locations along its range-of-motion. Also according to the present disclosure, an example storage panel may be rotatably mounted on a vertical axis or a horizontal axis. The storage panel is opened, exposing multiple parking locations for the storage modules on the storage panel and the termination region behind the storage panel. The desired intermediate fiber is removed from its parking location and connected to the desired outgoing fiber at the termination region. The storage panel is then closed followed by closing (i.e., shutting) the cabinet door.

According to the present disclosure, the mounting configuration of the FDH may be chosen based on the specific application. Variables such as the mounting location of the FDH, obstacles surrounding the mounting location of the FDH, and access methods available to the technician to reach the FDH may be considered when choosing the configuration of the FDH. The configuration selection of the storage panel may be jointly considered with the mounting configuration selection of the FDH. According to the present disclosure, an example FDH has three mounting configurations on a mounting pole. The three FDH mounting configurations include a right side mounting configuration, a rear mounting configuration, and a left side mounting configuration.

Given a specific application, the FDH mounting configuration and the storage panel configuration may be chosen based on convenience of service to the technician. For example, an application may have an existing mounting pole available to mount an FDH overhead. The example mounting pole may be near existing obstacles which require either the right side mounting configuration or the left side mounting configuration. The left side mounting configuration may be chosen if it offers a suitable ground surface for placement of the ladder. When the cabinet door of the FDH is opened, the ladder placement provides the technician with convenient access to the interior of the FDH. However, choosing the vertical axis mounting configuration for the storage panel may result in screening the technician's view of the termination region when the storage panel is opened. In this case, the horizontal axis mounting configuration for the storage panel is chosen providing the technician with convenient access to both the storage module(s) and the termination region. Other specific applications may favor other mounting configurations for the FDH and the storage panel within the FDH. For example, installations with limited room in front of and no room to the sides of the mounting pole may favor the rear FDH mounting configuration in combination with the vertical axis storage panel mounting configuration.

To provide additional convenience to the FDH servicing technician, an example cabinet door automatically stops when opened to a convenient intermediate position (i.e., an intermediate open position) and when fully open (i.e. at a fully opened positioned) and holds at either of these positions. The door stopping and holding feature is especially useful in windy conditions at pole mounted FDH installations requiring a ladder for access. At such installations, the door may be difficult to reach and close if opened beyond the intermediate position. With the door held at the intermediate position, the servicing technician is able to grab and close the door without stretching to reach it or dismounting from and repositioning the ladder to reach it. Without the door held at the intermediate position, the servicing technician may find it necessary to dismount from and reposition the ladder or may find it necessary to stretch to be able to reach the door. In embodiments incorporating the ladder bracket, repositioning the ladder may preclude the use of the ladder bracket and is therefore undesired. Furthermore, having the FDH door held at the intermediate or fully open position frees the technician from holding the door while servicing the FDH. To release the FDH door from the holding positions, a door stay assembly is lifted while the door is closed. In certain embodiments, more than one intermediate position may be provided.

In a preferred embodiment of the present disclosure, the ladder bracket is reconfigurable and can also function as an FDH support bracket. In an example embodiment, the ladder bracket configuration can compliment the FDH mounting configuration functioning as a support bracket in certain configurations and functioning as a ladder bracket in other configurations. In particular, the example ladder bracket functions as a ladder support when the FDH is mounted in the rear mounting configuration and functions as an FDH support bracket when the FDH is mounted in the right side mounting configuration or the left side mounting configuration. In a preferred embodiment, the ladder bracket, when functioning as a ladder support, supports the ladder in a position convenient for the technician when servicing the FDH.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the embodiments disclosed herein are based.

BRIEF DESCRIPTION OF THE DRAWINGS

FIG. 6 is a perspective view showing the front, top, and a right side of the example fiber distribution hub of FIG. 3 having the front door removed and the vertically configured hinged storage panel shown in an open position;

FIG. 7 shows an enlarged portion of FIG. 6 illustrating a parking location holding a storage module on the hinged storage panel of FIG. 3;

FIG. 8 is a perspective view showing a rear, top, and right side of the storage module of FIG. 7;

FIG. 9 is a perspective view showing the rear, top, and a left side of the storage module of FIG. 7 holding a connectorized fiber and a connector dust cap;

DETAILED DESCRIPTION

Figure 1:
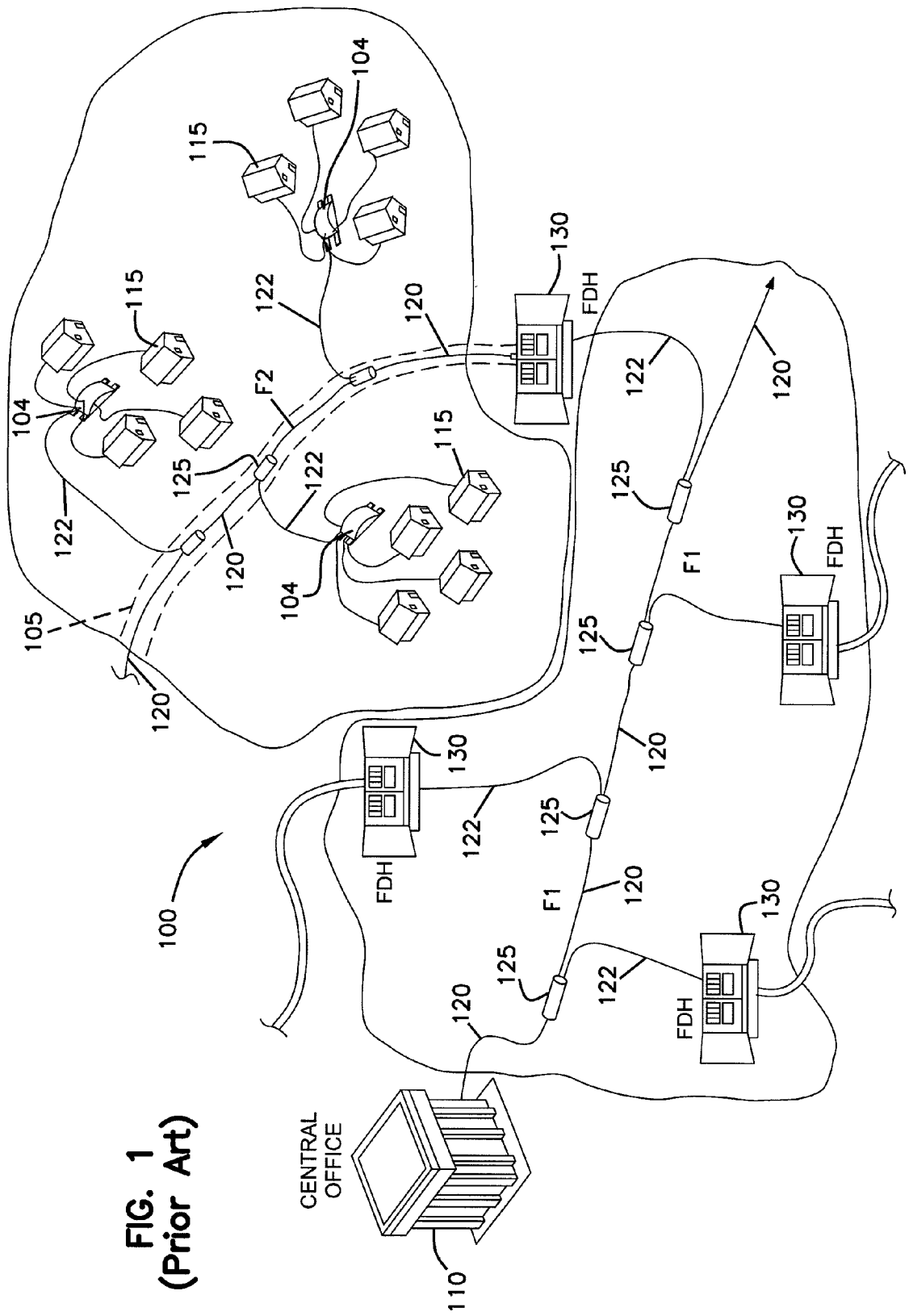
FIG. 1 shows a prior art passive fiber optic network.

The present disclosure relates to fiber optic cable systems. In particular, a fiber optic distribution system includes one or more fiber distribution hubs (FDHs) that provide an interface between a central office 110 and subscribers 115. The FDH contains terminated incoming fibers, coming from the central office 110, and terminated outgoing fibers, each going to one of the subscribers 115. Optical connections between the incoming fibers and the outgoing fibers may be established and rearranged within the FDH. A hinged storage panel, described and illustrated in example embodiments below, provides multiple mounting locations for multiple storage modules. The storage modules organize and hold the terminated incoming fibers until they are connected to the terminated outgoing fibers at a termination region, also described in example embodiments below. In preferred embodiments, the hinged storage panel covers the termination region unless and until the FDH is being serviced (e.g., when optical connections are being established and/or rearranged). When the FDH is serviced, the hinged storage panel uncovers the termination region and holds the storage modules in convenient proximity to the termination region. This convenient proximity facilitates manually establishing and switching the optical connections between the storage modules and the termination region. Various applications and mounting locations exist for FDHs. According to the present disclosure, the hinged storage panel is mountable to multiple configurations and is mounted on at least one variable position hinge. A configuration for the hinged storage panel is chosen based upon the given application and mounting location of the FDH among other things.

The FDH includes a cabinet enclosing the optical connections, the hinged storage panel, the termination region, and other components when closed. The cabinet is openable to expose the optical connections, the hinged storage panel, the termination region, and other components when being serviced. According to the present disclosure, the FDH cabinet is mountable in multiple configurations and locations in various environments. For example, FDH mounting locations include overhead on a mounting pole, on a wall, on a pedestal, and within an underground vault. Various environments may include obstacles near the FDH that interfere with access to the FDH and the servicing of the FDH. A mounting configuration for the FDH cabinet is chosen based upon the given application, mounting location, and environment of the FDH. Furthermore, the combination of the hinged storage panel configuration and the FDH cabinet mounting configuration may be considered together, further matching the overall FDH configuration to the given application, mounting location, and environment.

An example FDH cabinet includes multiple mounting areas each adapted for fastening to a mounting bracket set to facilitate the multiple mounting configurations. In one embodiment, the mounting bracket set is adapted to mount the FDH cabinet at one of the mounting areas to a mounting pole. In other embodiments, another mounting bracket set may be adapted to mount the FDH cabinet at one of the mounting areas to, for example, a wall, an underground vault, or other mounting location. An example mounting bracket set and other cabinet details are described in detail below.

The example FDH cabinet further includes a cabinet door configured to automatically stop and hold at one or more intermediate positions along its range-of-motion. In a preferred embodiment, the cabinet door includes stop-and-hold features that automatically stop the door when it is opened approximately 90 degrees and 135 degrees and holds the door at these positions. In certain embodiments, the stop-and-hold features may be effective at other door positions including at the door's range-of-motion limits. The door stop-and-hold function aids in servicing the FDH especially in windy conditions. To release the FDH door from the holding positions, a door stay assembly is lifted while the door is closed. In FDHs with multiple doors, the stop-and-hold function may be included in one or more of the doors.

Figure 2:
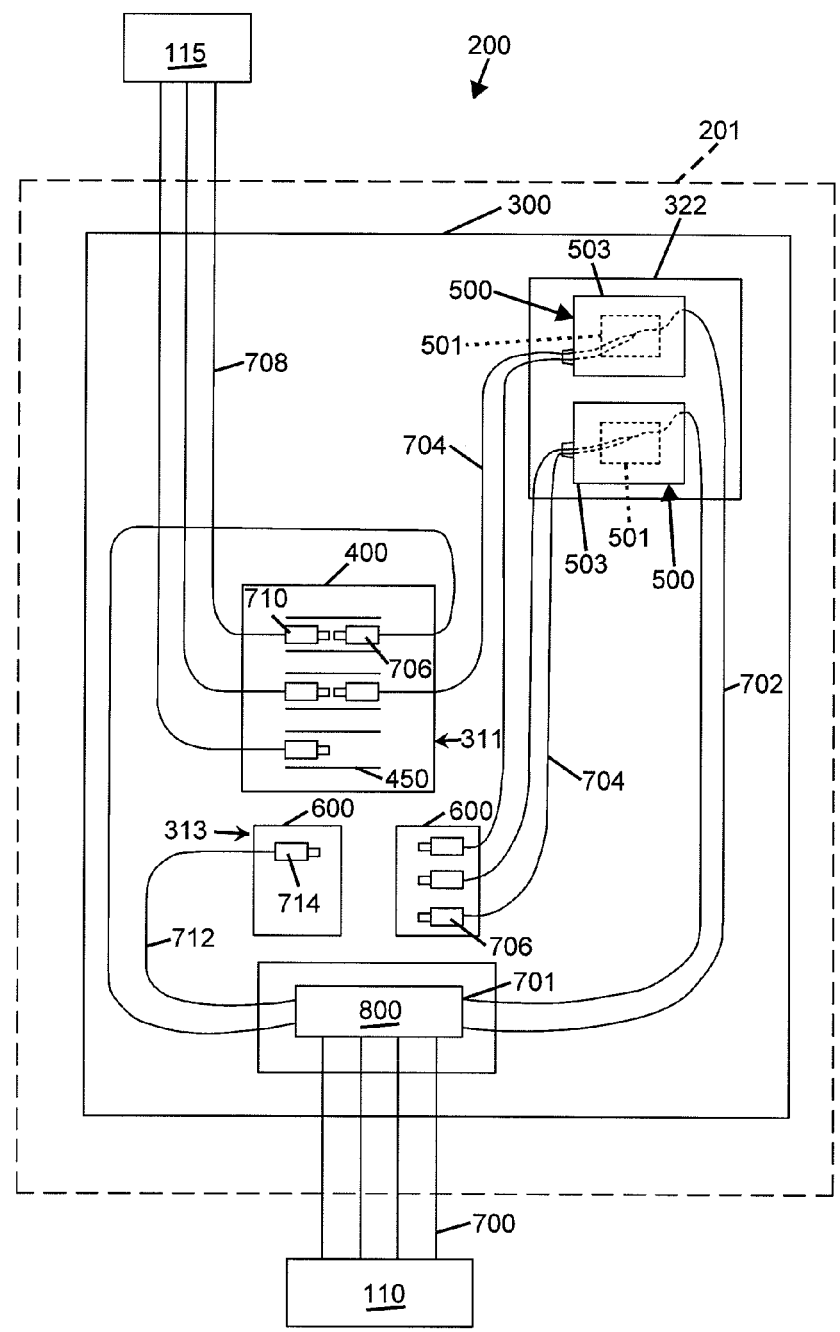
FIG. 2 is a schematic diagram showing an example cable routing scheme for a fiber distribution hub.

Turning now to the figures, FIG. 2 is a schematic diagram showing an example cable routing scheme for example FDH 200. The FDH 200 generally administers connections at a termination region 311 between incoming fibers and outgoing fibers in an Outside Plant (OSP) environment. As the term is used herein, "a connection" between fibers includes both direct and indirect connections. Examples of incoming fibers include feeder cable 700 fibers that enter the FDH 200 and intermediate fibers (e.g., connectorized pigtails 704 extending from splitters 500 and patching fibers/jumpers) that connect the feeder cable 700 fibers to the termination region 311. Examples of outgoing fibers include subscriber cable 708 fibers that exit the FDH 200 and any intermediate fibers that connect the subscriber cable 708 fibers to the termination region 311. The FDH 200 provides an interconnect interface for optical transmission signals at a location in the network where operational access and reconfiguration are desired. For example, as noted above, the FDH 200 can be used to split the feeder cables 700 and connect the split feeder cables 700 to distribution cables 708 routed to subscriber locations 115. In addition, the FDH 200 is designed to accommodate a range of alternative sizes and fiber counts and support factory installation of pigtails 704, fanouts, and splitters 500.

Figure 16:
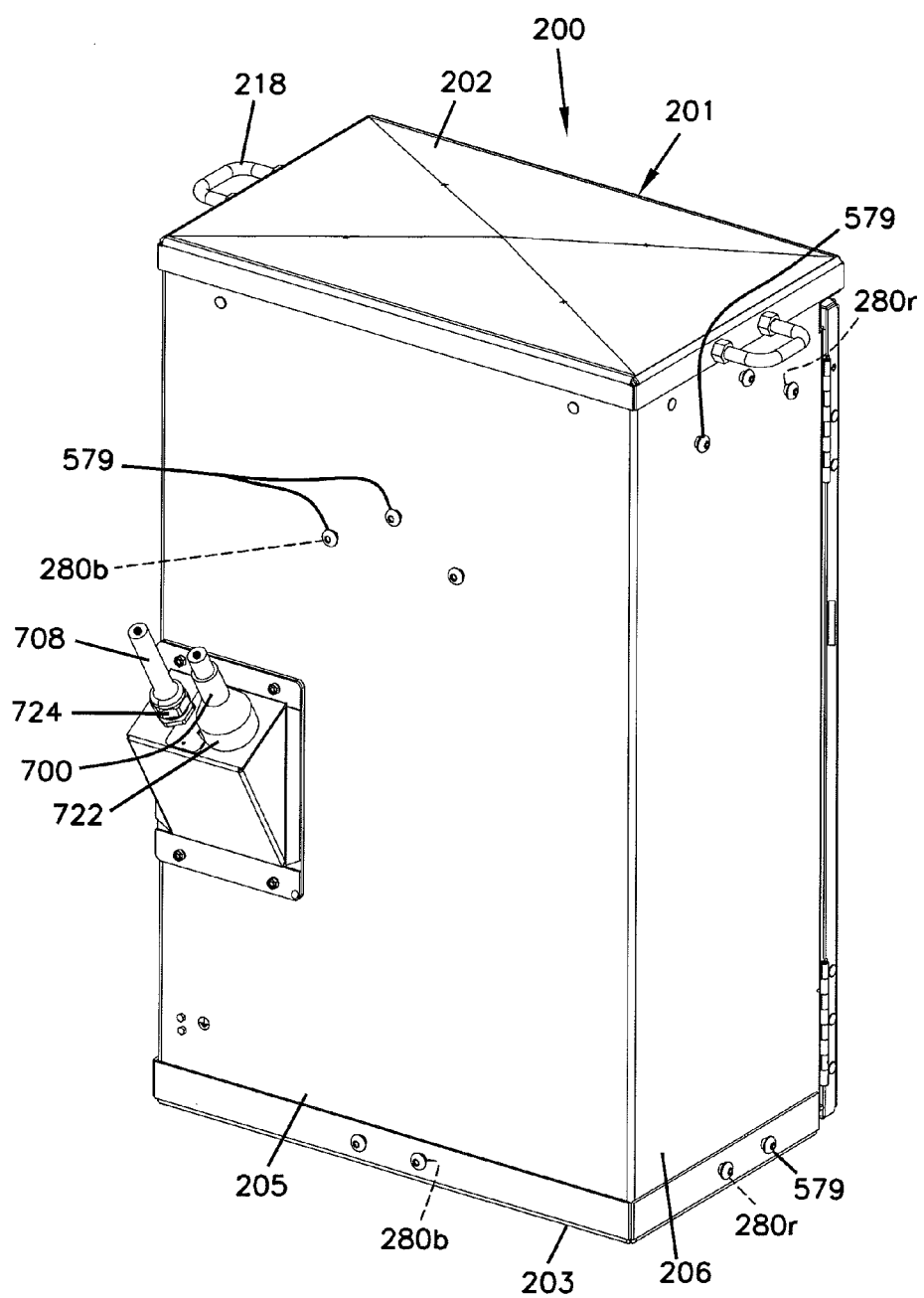
FIG. 16 is a perspective view showing a rear, the top, and the right side of the example fiber distribution hub of FIG. 3, the view illustrating an entrance location for incoming fibers and an exit location for outgoing fibers.

As shown at FIG. 2, the feeder cable 700 is initially routed into the example FDH 200 through a cabinet 201 (e.g., typically through the back or bottom of the cabinet 201 as shown at FIG. 16). In certain embodiments, the fibers of the feeder cable 700 can include ribbon fibers. An example feeder cable 700 may include twelve to forty-eight individual fibers connected to the service provider's central office 110. In certain embodiments, after entering the cabinet 201, the fibers of the feeder cable 700 are routed to a feeder cable interface 800 (e.g., fiber optic adapter modules, a splice tray, etc.). At the feeder cable interface 800, one or more of the fibers of the feeder cable 700 are individually connected to ends 701 of separate splitter input fibers 702. The splitter input fibers 702 are routed from the feeder cable interface 800 to a splitter mounting location 322 at which a plurality of splitter modules 500 can be mounted. Each splitter module 500 includes at least one fiber optic splitter 501 positioned within a splitter housing 503. At the splitter mounting location 322, the splitter input fibers 702 are optically connected to separate splitter modules 500, wherein the input fibers 702 are each split by the fiber optic splitters of the splitter module 500 into multiple pigtails 704, each having a connectorized end 706. In other embodiments, however, the fibers of the feeder cable 700 can be connectorized and can be routed directly to the splitter modules 500 thereby bypassing or eliminating the need for an intermediate feeder cable interface 800.

When the pigtails 704 are not in service, the connectorized ends 706 can be temporarily stored on a storage module 600 that is mounted at a storage region 313 of a swing frame 300. When the pigtails 704 are needed for service, the pigtails 704 are routed from the splitter modules 500 to a termination module 400 that is provided at the termination region 311 of the swing frame 300. At the termination module 400, the connectorized ends 706 of the pigtails 704 are connected to the connectorized ends 710 of the fibers of the distribution cable 708 within an adaptor 450. The termination region 311 is the dividing line between the incoming fibers and the outgoing fibers. A typical distribution cable 708 forms the F2 portion of a network (see FIG. 1) and typically includes a plurality of fibers (e.g., 144, 216 or 432 fibers) that are routed from the FDH 200 to subscriber locations 115.

In certain embodiments, one or more of the fibers of the feeder cable 700 are not connected to any of the splitter modules 500. Rather, these fibers of the feeder cable 700 are connected to pass-through fibers 712 having connectorized ends 714. The pass-through fibers 712 are connected to the termination modules 400, without first connecting to the splitter modules 500. By refraining from splitting the fiber 712, a stronger signal can be sent to one of the subscribers. The connectorized ends 714 of the pass-through fibers 712 can be stored at the storage region 313 when not in use.

The splitter modules 500 and storage modules 600 can be incrementally added to the swing frame 300. The connectorized pigtails 704 are typically stored in one or more storage modules 600 prior to installation on the swing frame 300. In certain embodiments, the connector 706 of each pigtail 704 is secured in a storage module 600 before the splitter module 500 leaves the factory.

As illustrated at FIGS. 8 and 9, the storage module 600 includes a body 610 having a front side 602, a rear side 604, a top, and a bottom. The body 610 is configured to hold at least one fiber connector 706 within at least one port 606. Typically, the body 610 is configured to hold about sixteen connectors 706 and includes about sixteen ports 606. In certain embodiments, the body 610 is arranged to retain the fiber connectors 706 in a single row configuration. In other embodiments, the body 610 can be arranged to hold the connectors 706 in a square pattern or in any other desired configuration. When one of the ports 606 is not occupied by one of the connectors 706, an adapter dust plug 453 can be stored within the port 606. A plurality of dust cap holders 616 are provided on the body 610 to store connector 706 dust caps 458. A latch 612 is provided near the top of the body 610 and a tab 614 is provided near the bottom for mounting purposes. More information regarding the storage modules 600 can be found at U.S. Pat. No. 7,198,409, issued on Apr. 3, 2007, entitled FIBER OPTIC CONNECTOR HOLDER AND METHOD; at U.S. Pat. No. 7,233,731, issued on Jun. 19, 2007, entitled TELECOMMUNICATIONS CONNECTION CABINET; and at U.S. Pat. No. 7,218,827, issued on May 15, 2007, entitled MULTI-POSITION FIBER OPTIC CONNECTOR HOLDER AND METHOD which are hereby incorporated by reference in their entirety.

In certain embodiments, as illustrated at FIGS. 6 through 10, the storage region 313 is defined in part by a variable position, hinged storage panel 250. The storage panel 250 includes a plurality of upper openings 266 and a plurality of lower openings 268. The latch 612 of the storage module 600 is designed to removably snap into any of the upper openings 266 while the tab 614 is engaged in a paired lower opening 268. Each of the opening 266, 268 pairs defines a storage module 600 mounting location 264 which can be arranged in any desired configuration within the storage panel 250. In the example shown at FIG. 6, the storage panel 250 defines twenty-two of the storage module 600 mounting locations 264. Each of the opening 266, 268 pairs is configured to receive a storage module body 610 arranged to retain sixteen fiber connectors 706 in a row. Other embodiments may employ fewer or more than twenty-two of the mounting locations 264 and may employ storage module bodies arranged to retain fewer or more than sixteen fiber connectors 706.

Figure 21:
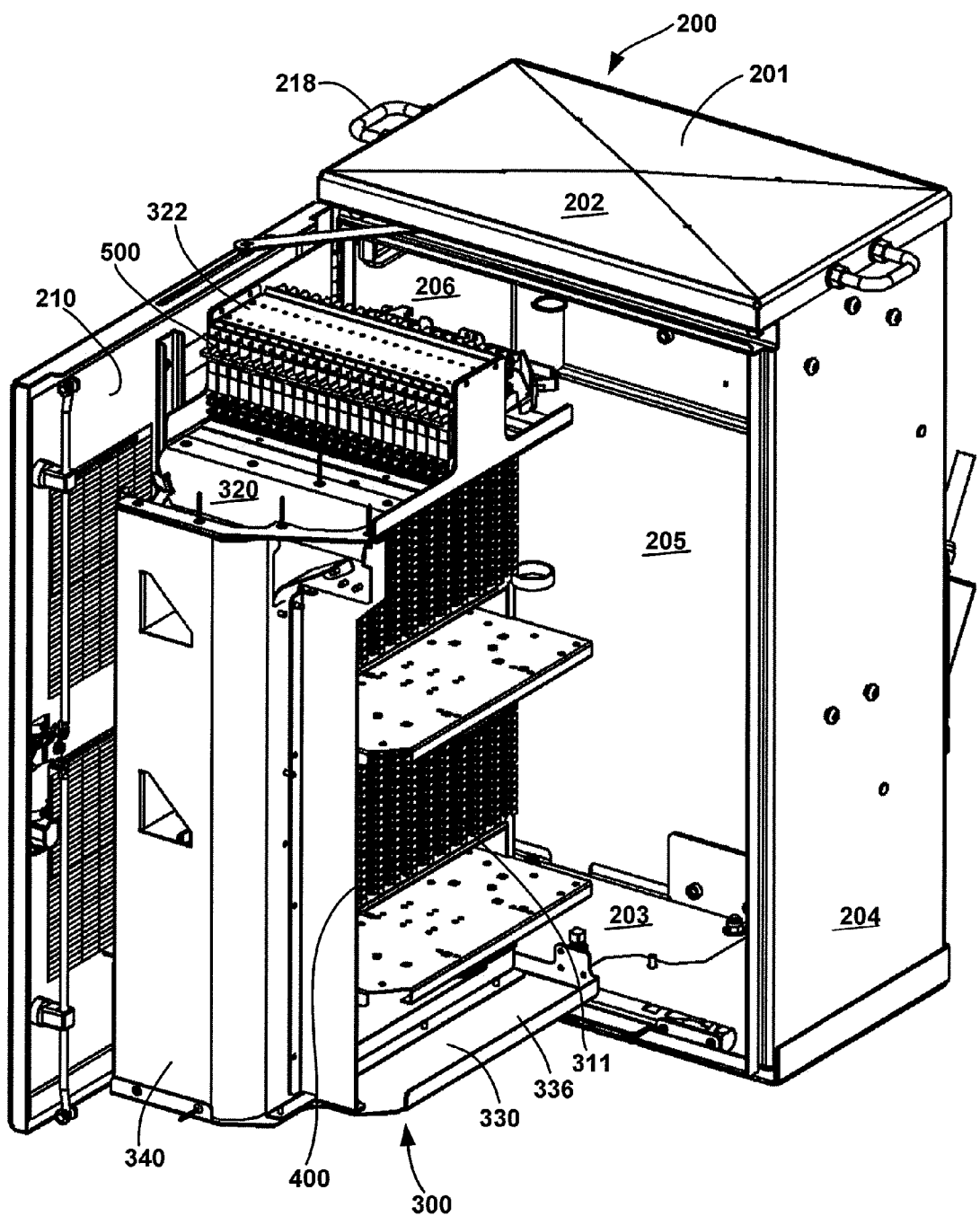
FIG. 21 is a perspective view showing the front, top, and left side of the example fiber distribution hub of FIG. 3 with the front door shown in the open position and the swing frame of FIG. 10 shown in a service position.
Figure 22:
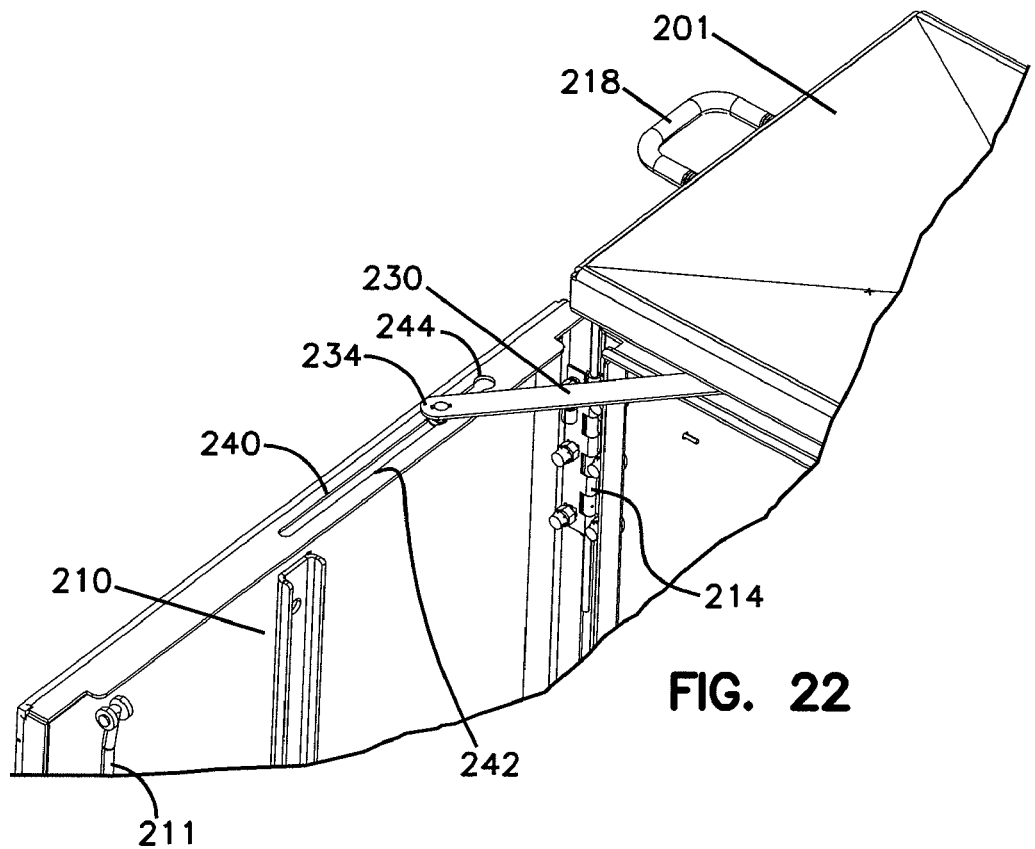
FIG. 22 is a partial perspective view showing the front, top, and leftward side of the example fiber distribution hub of FIG. 3 with the front door in the open position and a door stay assembly in an intermediate holding position.
Figure 23:
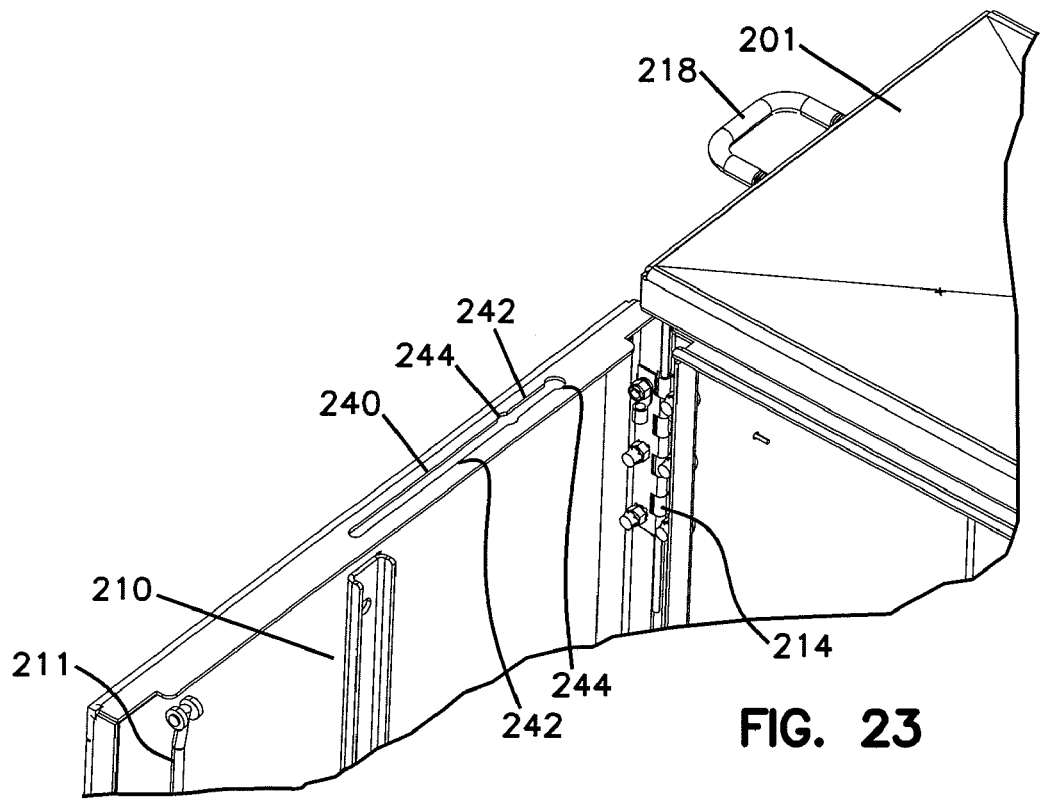
FIG. 23 is a partial perspective view showing the front, top, and leftward side of the example fiber distribution hub of FIG. 3 with the front door in the open position and the door stay assembly of FIG. 22 removed to fully reveal a door holding slot.
Figure 24:
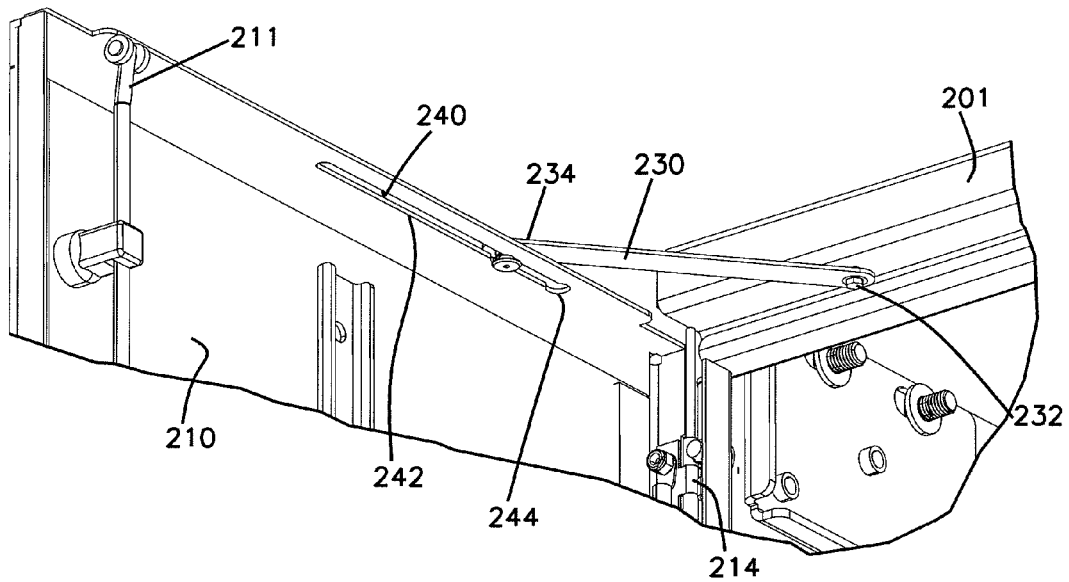
FIG. 24 is a partial perspective view showing the front, bottomward, and leftward side of the example fiber distribution hub of FIG. 3 with the front door in the open position and the door stay assembly of FIG. 22 in the intermediate holding position.
Figure 25:
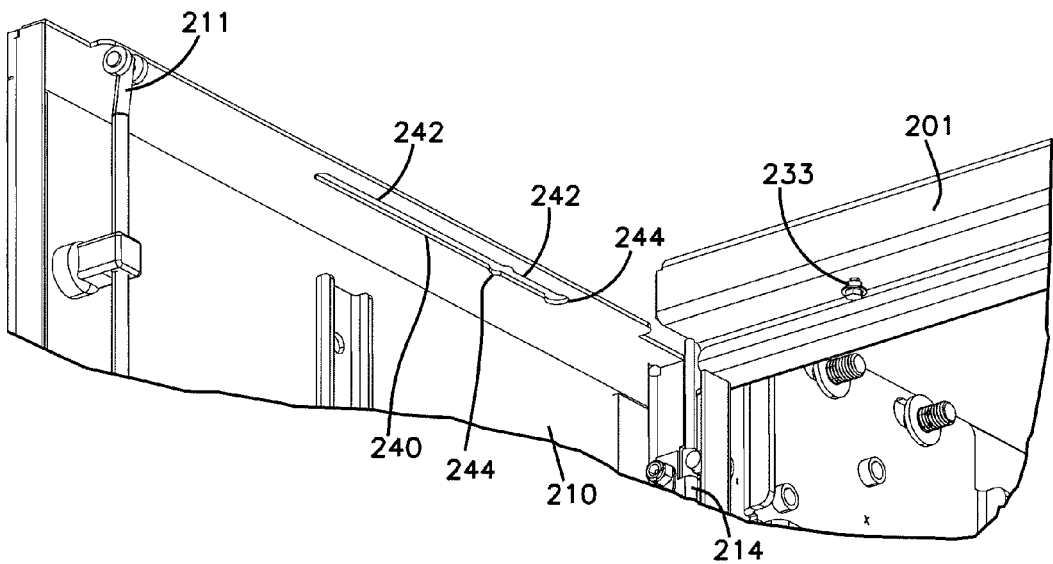
FIG. 25 is a partial perspective view showing the front, bottomward, and leftward side of the example fiber distribution hub of FIG. 3 with the front door in the open position and the door stay assembly of FIG. 22 removed to fully reveal the door holding slot of FIG. 23.
Figure 26:
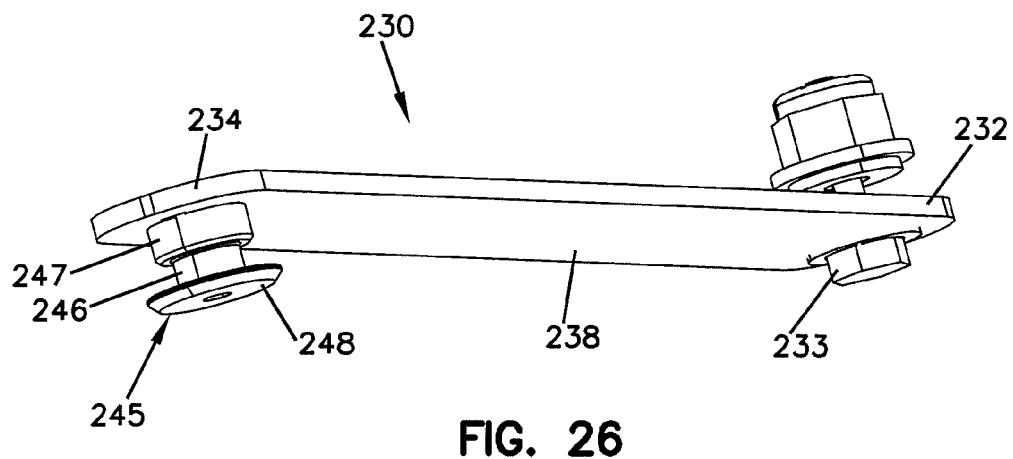
FIG. 26 is a perspective view showing the bottom of the door stay assembly of FIG. 22.
Figure 27:
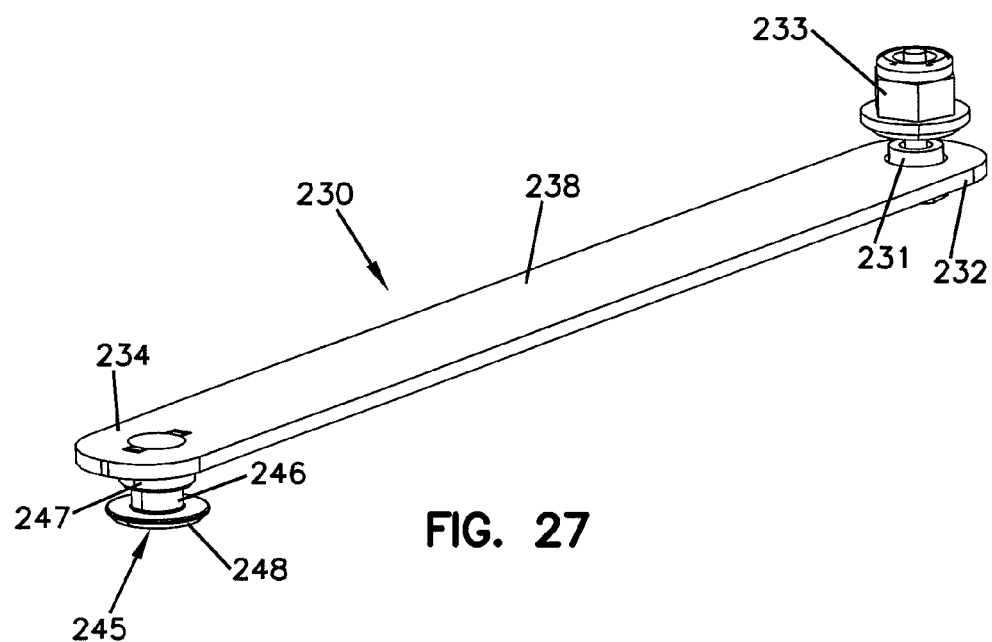
FIG. 27 is a perspective view showing the top of the door stay assembly of FIG. 22.
Figure 28:
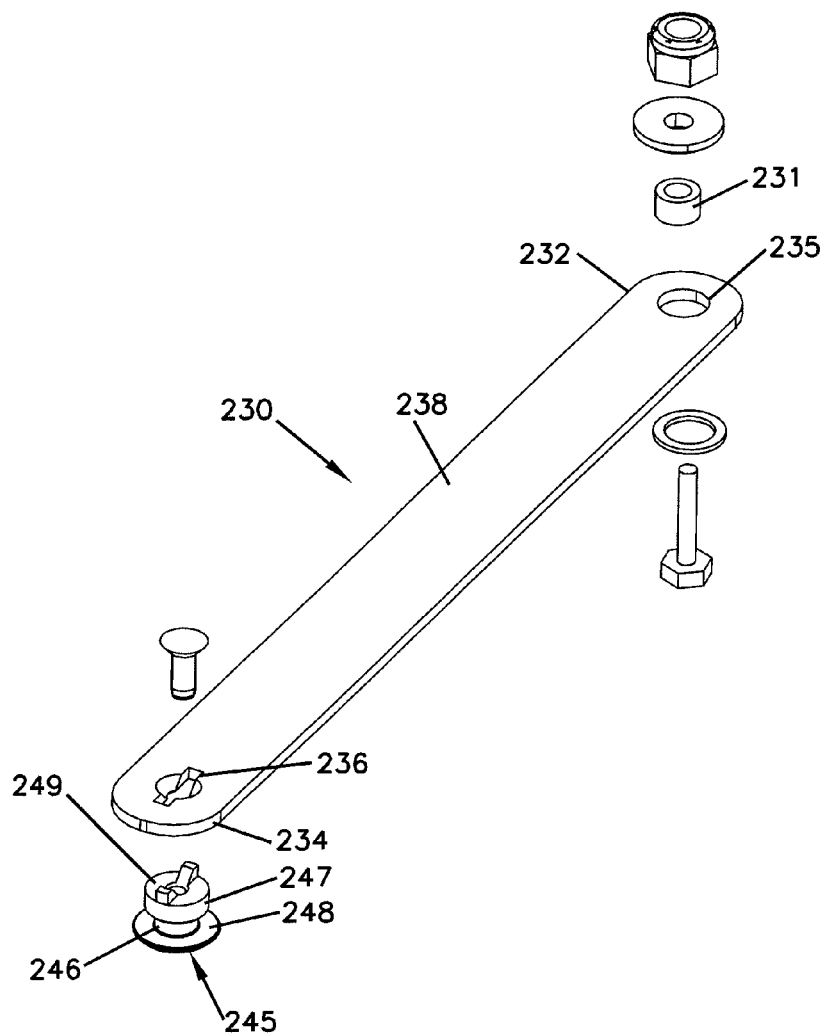
FIG. 28 is an exploded perspective view showing the top of the door stay assembly of FIG. 22.

When one of the splitter modules 500 is loaded into the splitter mounting location 322 during installation (see FIG. 21), the corresponding storage modules 600 are loaded onto the storage panel 250. For ease in viewing FIG. 10, only two sets of splitter outputs are illustrated, each having one set of pigtails 704 and one storage module 600. The pigtail 704 sets extending from the splitter modules 500 to the storage modules 600 are routed along a path 705 through one or more guide rings 270 that allows the hinged storage panel 250 to rotate through a desired range-of-motion.

Figure 10:
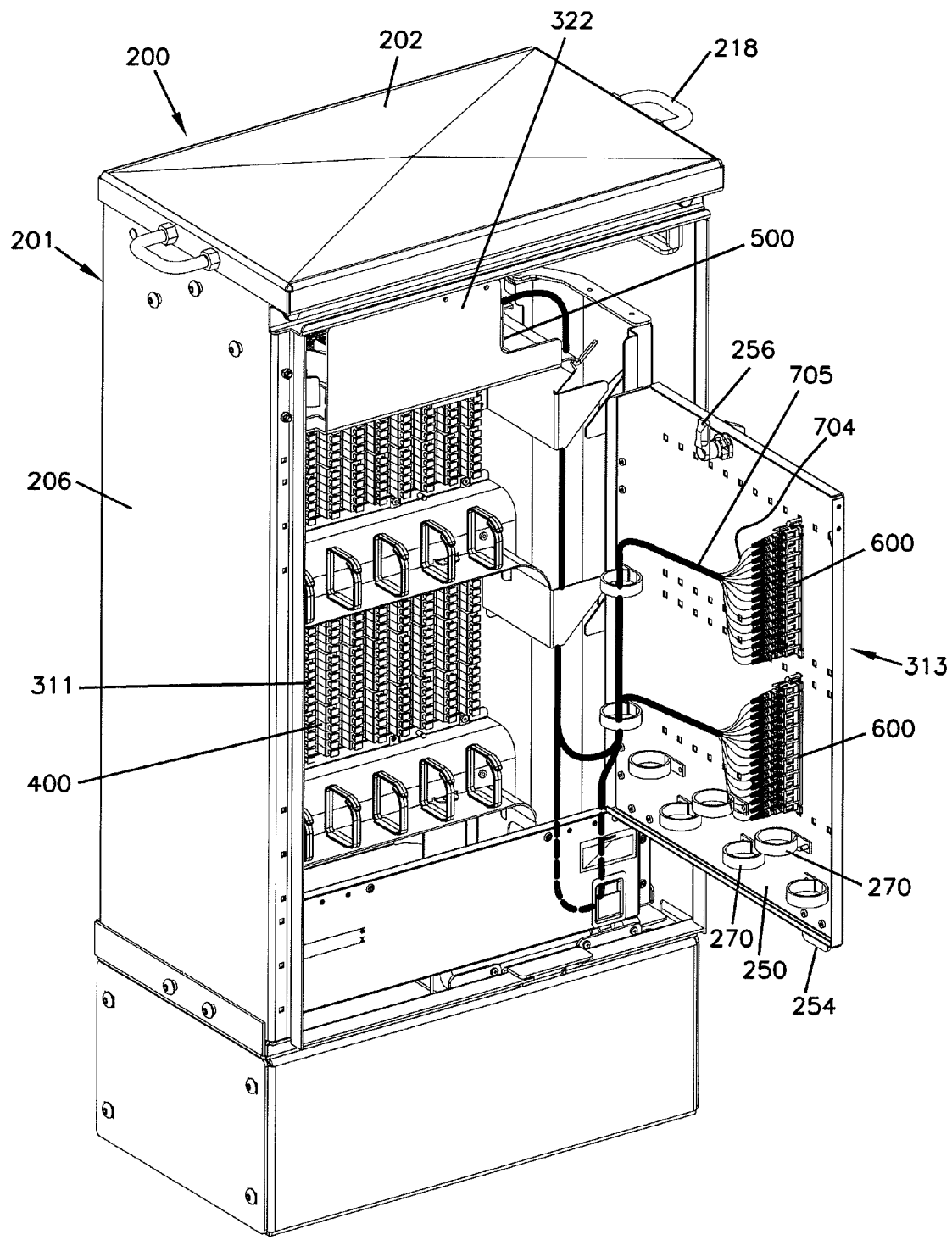
FIG. 10 is a perspective view showing the front, top, and right side of the example fiber distribution hub of FIG. 3 having the front door removed and the vertically configured hinged storage panel shown in the open position of FIG. 6, the view illustrating an example cable/fiber route from a splitter module mounted on a swing frame to the storage module of FIG. 7 mounted on the hinged storage panel of FIG. 3.
Figure 14:
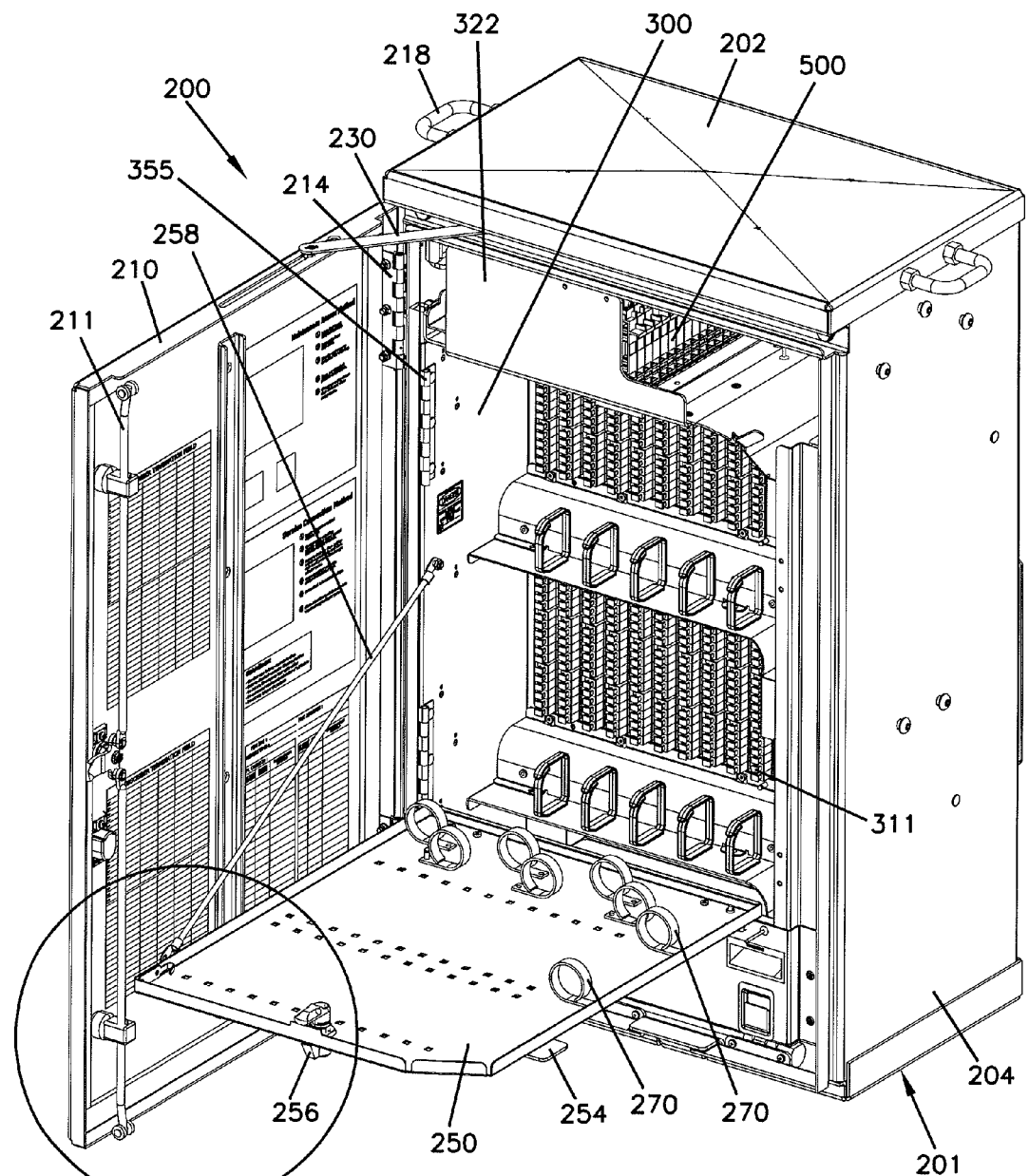
FIG. 14 is a perspective view showing the front, top, and left side of the example fiber distribution hub of FIG. 3 with the horizontally configured hinged storage panel shown in another open position.
Figure 15:
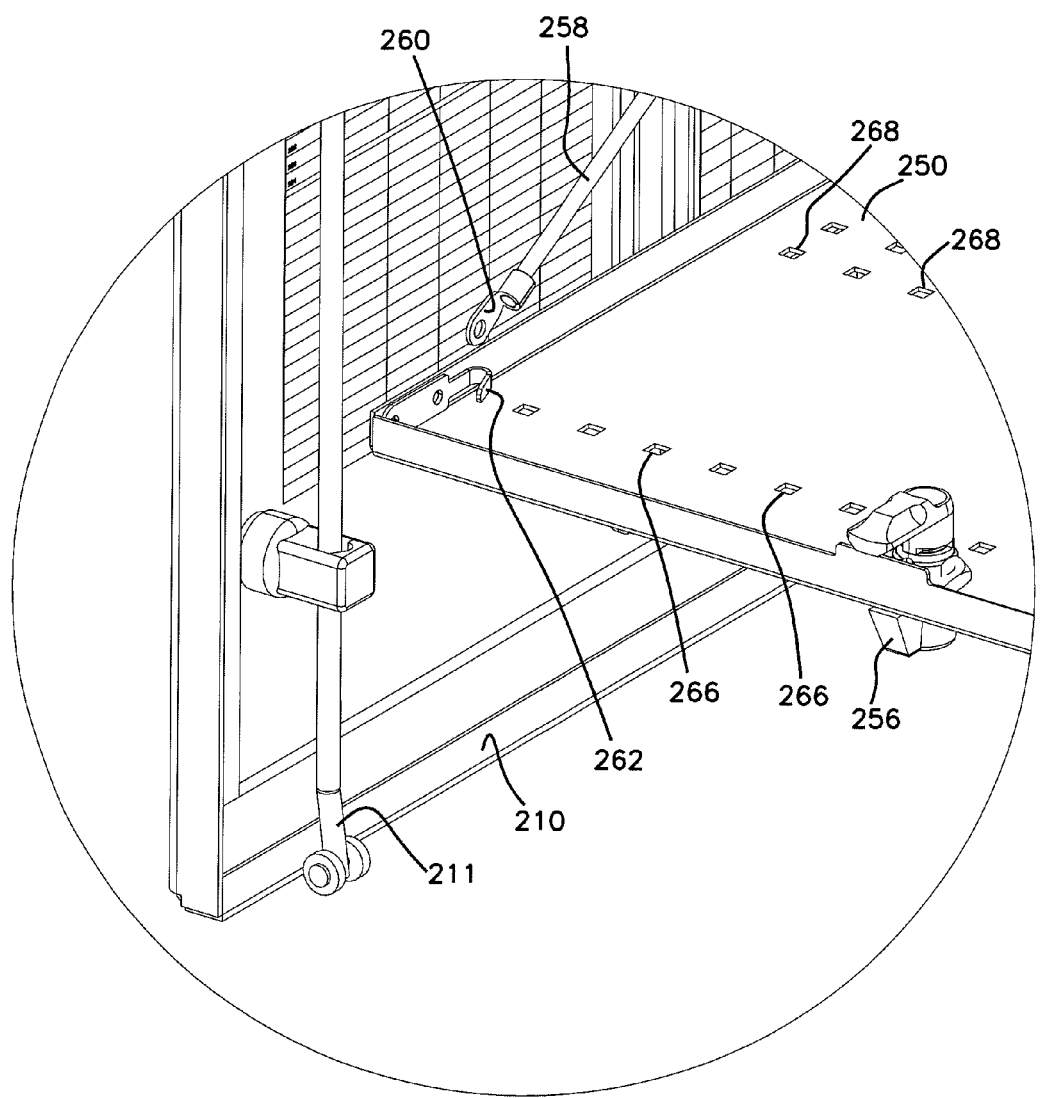
FIG. 15 shows an enlarged portion of FIG. 14 illustrating a storage panel support cable with a ring terminal and a storage panel support hook.

The range-of-motion includes an open position (see FIGS. 6, 10, 14, and 15) and a closed position (see FIGS. 3 and 11) of the hinged storage panel 250. The open position can be one of several open positions depending on the configuration of the hinged storage panel 250 as will be further described hereinafter. For example FIGS. 6 and 10 show one open position of the hinged storage panel 250 and FIGS. 14 and 15 show another open position. The hinged storage panel 250 is moveable between the closed position and the open position. The hinged storage panel 250 is typically in the closed position when the FDH 200 is in normal service and when the FDH 200 is being stored or transported (e.g., before the FDH 200 is initially installed). The hinged storage panel 250 is typically moved to the open position when certain service operations are performed on the FDH 200 by the technician (e.g., the connectorized ends 706 are reconfigured between being stored on the hinged storage panel 250 and being placed in service on the termination region 311 of the swing frame 300). After the service operation is completed, the hinged storage panel 250 is typically returned to the closed position.

Referring now to FIGS. 3 through 7, 10 through 18, and 20, the example fiber distribution hub (FDH) 200 in accordance with the principles of the present disclosure is shown. The example FDH 200 includes the example cabinet 201 that houses internal components. The example cabinet 201 has a top panel 202, a bottom panel 203, a left side panel 204, a back panel 205, and a right side panel 206. At least one cabinet door 210 covers the cabinet 201 front when closed. The door 210 is rotatably mounted to the cabinet 201 by at least one hinge 214 and is secured to the cabinet 201 by a door latch 211 when closed. The door 210 is held at certain open positions by a door stay assembly 230 further described below. As illustrated at FIG. 16, the cabinet 201 includes an opening 722 through which the feeder cable (e.g., or F1 cable) 700 enters and another opening 724 through which the subscriber cable 708 exits the cabinet 201.

Figure 17:
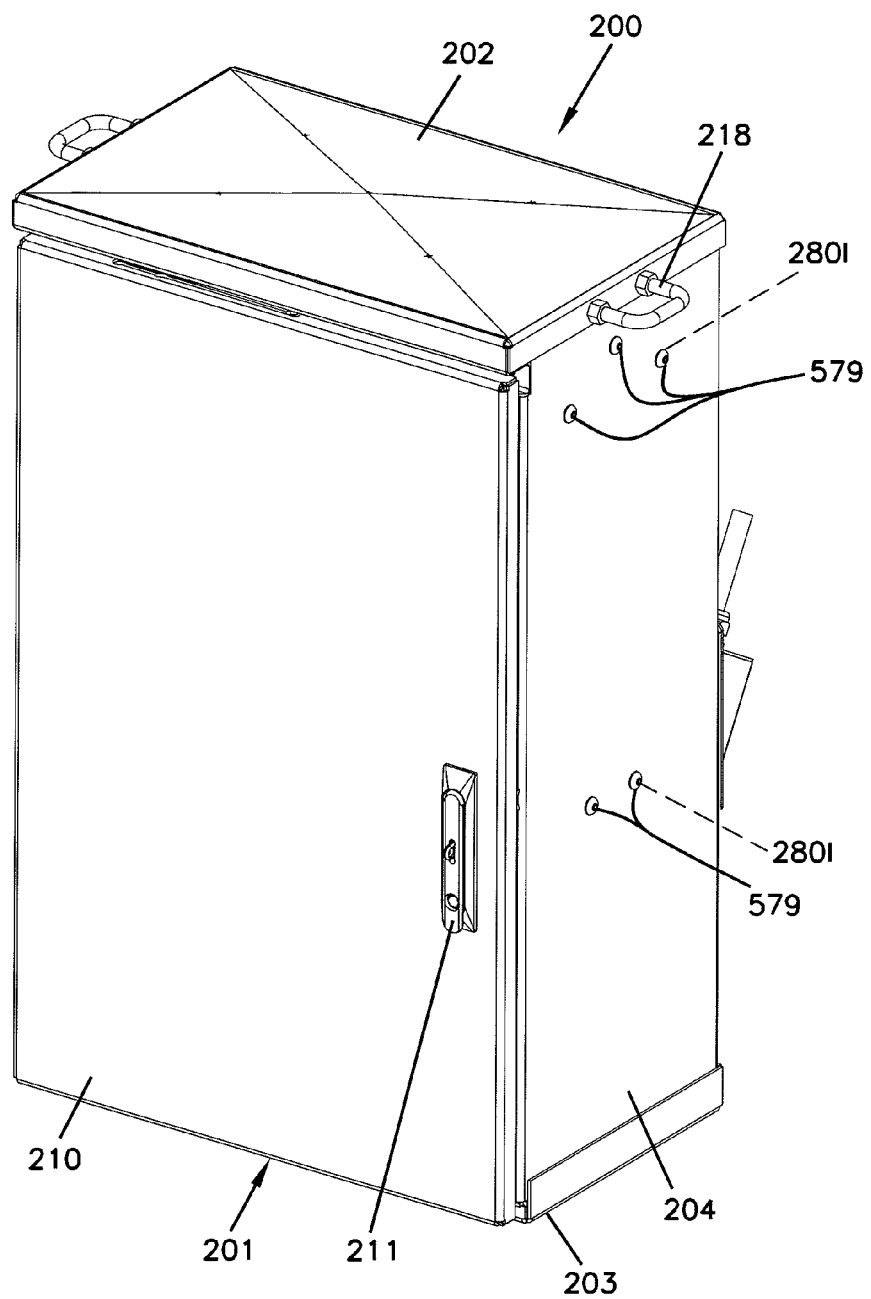
FIG. 17 is a perspective view showing the front, top, and left side of the example fiber distribution hub of FIG. 3 with the front door shown in a closed position.

As illustrated at FIGS. 16 and 17, the example FDH cabinet 201 includes three sets of mounting holes 280b, 280l, and 280r, each set 280b, 280l, 280r defining a separate mounting area. The mounting hole set 280b facilitates mounting the FDH 200 on its back panel 205. Likewise, the mounting hole set 280r facilitates right side panel 206 mounting and the mounting hole set 280l facilitates left side panel 204 mounting. In other embodiments, two or fewer mounting area(s) may be provided. In still other embodiments, four or more mounting areas may be provided.

In general, the cabinet 201 of the FDH 200 is configured to protect the internal components against rain, wind, dust, rodents and other contaminants. However, the cabinet 201 remains relatively lightweight for easy installation and breathable to prevent accumulation of moisture in the FDH 200. In certain embodiments, an aluminum construction with a heavy powder coat finish also provides for corrosion resistance. In one example embodiment, the cabinet 201 is manufactured from heavy gauge aluminum and is NEMA-4X rated. In other embodiments, however, other materials can also be used. As shown at FIGS. 3, 11, 14, 16, and 21, loops 218 can be provided on the cabinet 201 for facilitating deployment of the cabinet 201 at a desired location. The loops 218 can be used to position the cabinet 201 using a crane. In particular, the crane can lower the cabinet 201 into an underground region. In certain embodiments, the loops 218 are removable or can be adjusted to not protrude from the top cabinet panel 202.

Referring now to FIGS. 3, 10, 11, 14, and 21, the swing frame 300 is pivotably mounted on hinges 355 within and to the cabinet 201 and supports the termination region 311 among other things. The swing frame 300 is moveable between a stowed position (see FIGS. 3, 10, 11, and 14) and a service position (see FIG. 21). The swing frame 300 is typically in the stowed position when the FDH 200 is in normal service and when the FDH 200 is being stored or transported (e.g., before the FDH 200 is initially installed). The swing frame 300 is typically moved to the service position when certain service operations are performed on the FDH 200 by the technician (e.g., when reconfiguring, adding, or removing the pigtails 704, the fanouts, the splitters 500, the feeder cable 700, the feeder cable interface 800, the splitter input fibers 702, etc.) After the service operation is completed, the swing frame 300 is typically returned to the stowed position. The swing frame 300 includes a top panel 320, a bottom panel 330, a left panel 340, and a rear portion 336. The storage panel 250 is mounted to the swing frame 300 with a pair of variable position hinges 252 and can hold at least one storage module 600. Further details regarding swing frames, termination regions, storage panels, storage modules, and FDHs in general are disclosed at U.S. Patent Application Publication No. 2007/0189691 A1, published Aug. 16, 2007, entitled FIBER DISTRIBUTION HUB WITH SWING FRAME AND MODULAR TERMINATION PANELS, now U.S. Pat. No. 7,720,343, issued May 18, 2010; at U.S. Patent Application Publication No. 2006/0008231 A1, published Jan. 12, 2006, entitled HINGED PARKING IN FIBER DISTRIBUTION HUBS, now U.S. Pat. No. 7,369,741, issued May 6, 2008; and at U.S. Pat. No. 7,369,741, issued May 6, 2008, entitled STORAGE ADAPTER WITH DUST CAP POSTS, which are hereby incorporated by reference in their entirety.

Figure 3:
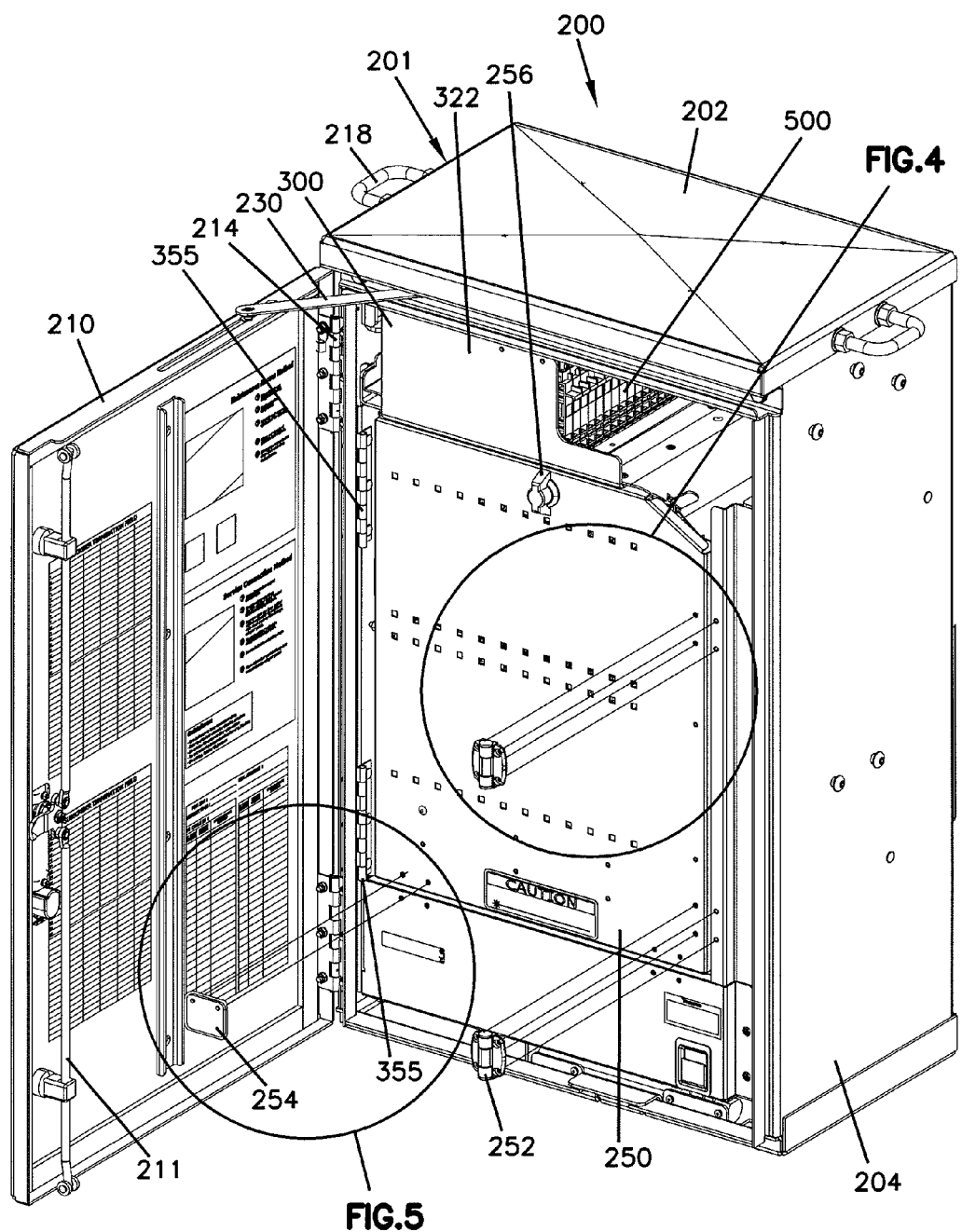
FIG. 3 is a perspective view showing a front, top, and left side of an example fiber distribution hub having a cabinet with a front door shown in an open position and a hinged storage panel configured in a vertical hinge configuration shown in a closed position.
Figure 4:
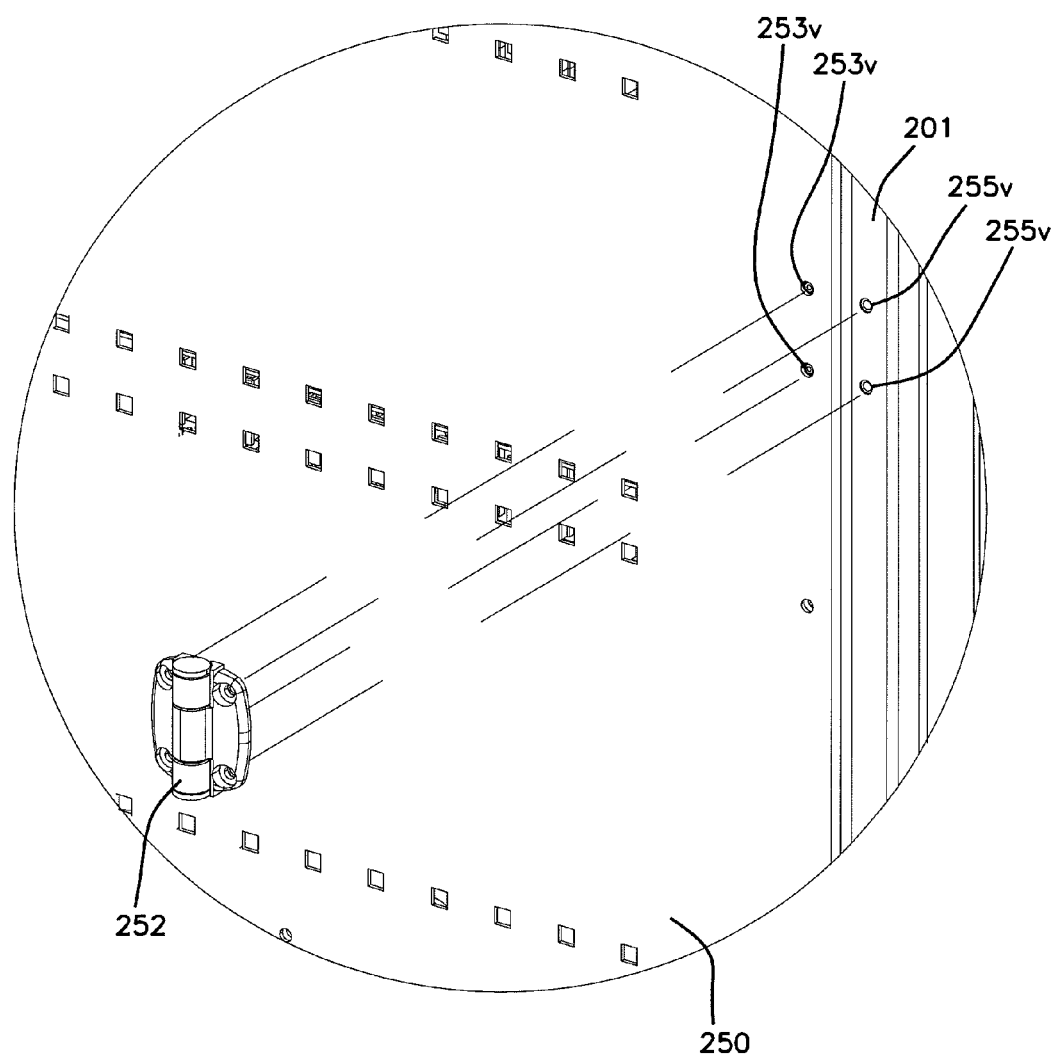
FIG. 4 shows an enlarged exploded portion of FIG. 3 illustrating a first hinge mounting position for mounting a hinge resulting in the vertical hinge configuration of FIG. 3.
Figure 5:
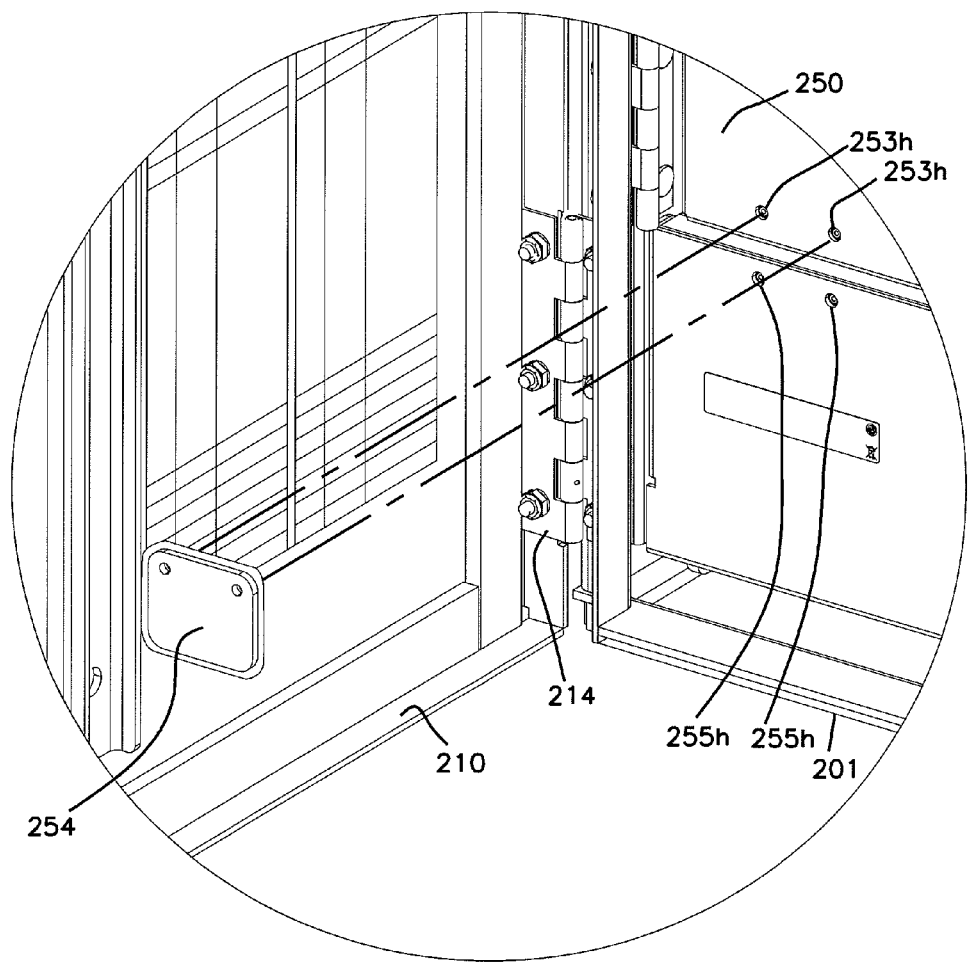
FIG. 5 shows an enlarged exploded portion of FIG. 3 illustrating a second hinge mounting position with a stop plate mounted thereon.
Figure 11:
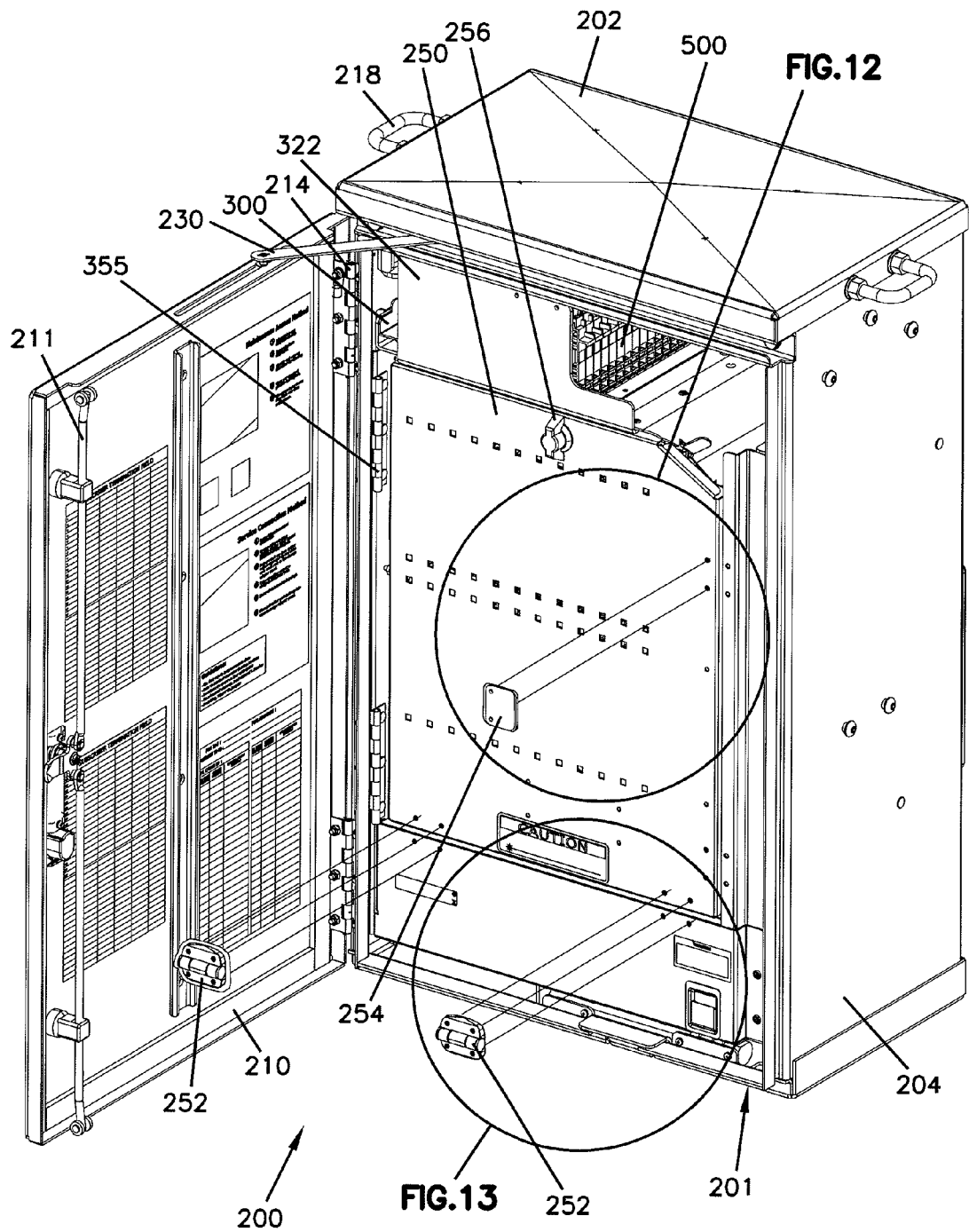
FIG. 11 is a perspective view showing the front, top, and left side of the example fiber distribution hub of FIG. 3 with the front door in the open position and the hinged storage panel configured in a horizontal hinge configuration shown in a closed position.
Figure 12:
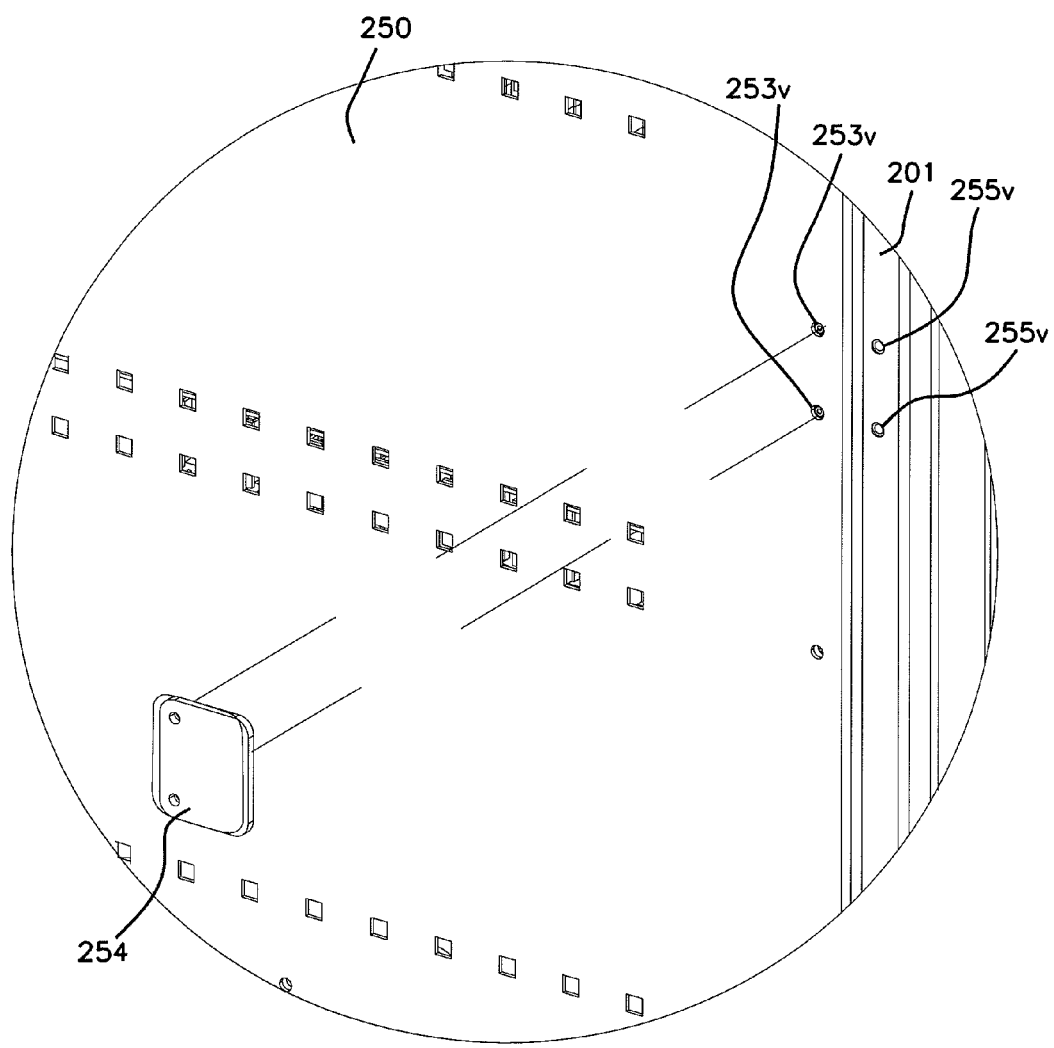
FIG. 12 shows an enlarged exploded portion of FIG. 11 illustrating the first hinge mounting position of FIG. 4 with the stop plate of FIG. 5 mounted thereon.
Figure 13:
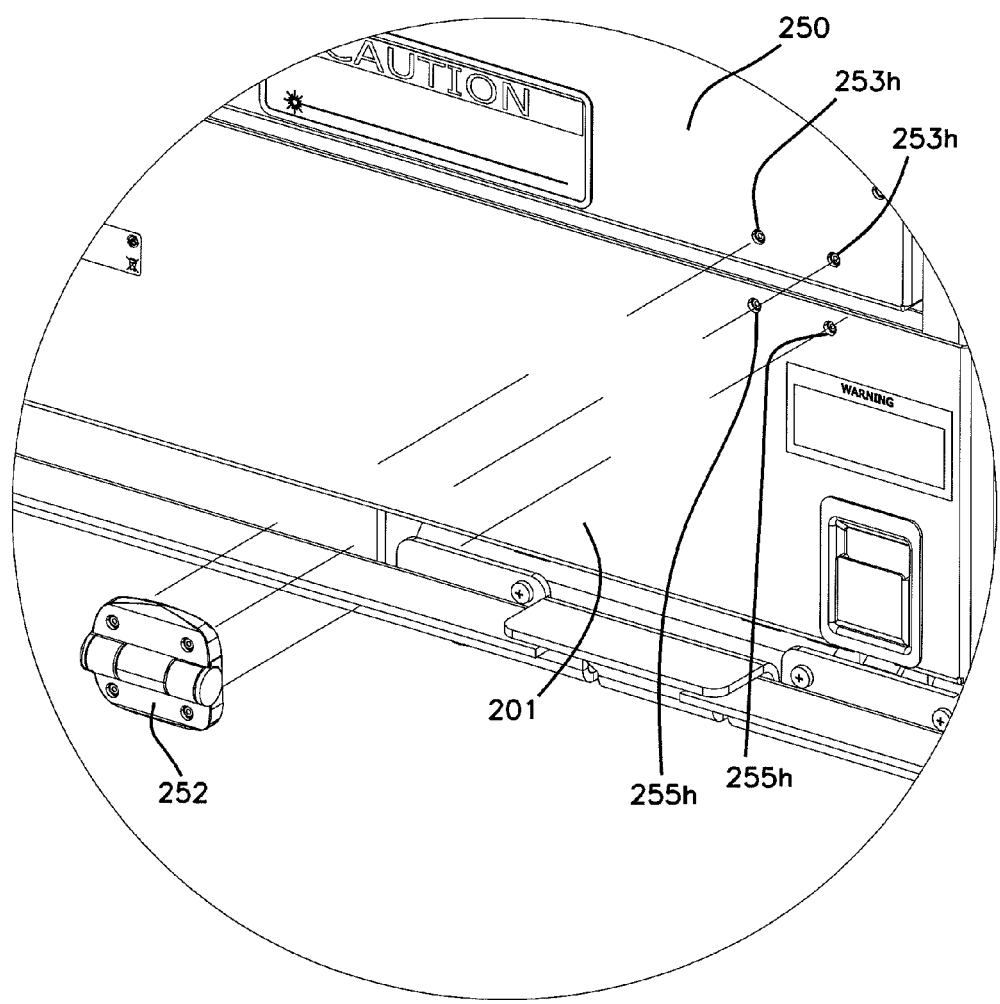
FIG. 13 shows an enlarged exploded portion of FIG. 11 illustrating a third hinge mounting position for mounting the hinge of FIG. 4 resulting in the horizontal hinge configuration of FIG. 11.

In a preferred embodiment, illustrated at FIGS. 3 through 5 and 11 through 15 the storage panel 250 can be configured with a vertical axis hinge 252 mount or a horizontal axis hinge 252 mount. As illustrated at FIGS. 3 and 4, the storage panel 250 includes a first set and a second set of vertical hinge mounting holes 253v matched to two sets of vertical hinge mounting holes 255v included on the swing frame 300. The vertical axis hinge 252 configuration is obtained by fastening one of the hinges 252 to the first set of mount holes 253v, 255v and the other hinge 252 to the second set of mounting holes 253v, 255v. As illustrated at FIGS. 11 and 13, the storage panel 250 includes a first set and a second set of horizontal hinge mounting holes 253*h* matched to two sets of horizontal hinge mounting holes 255*h* included on the swing frame 300. The horizontal axis hinge 252 configuration is obtained by fastening one of the hinges 252 to the first set of mount holes 253*h*, 255*h* and the other hinge 252 to the second set of mounting holes 253*h*, 255*h*. To stop the storage panel 250 at the closed position in both the horizontal and vertical axis hinge 252 configurations, a stop plate 254 is provided. As illustrated at FIGS. 3 and 5, the stop plate 254 is fastened to the set of horizontal hinge mounting holes 253*h* farthest from the hinges 252 when the storage panel 250 is in the vertical axis hinge 252 configuration. Similarly, as illustrated at FIGS. 11 and 12, the stop plate 254 is fastened to the set of vertical hinge mounting holes 253*v* farthest from the hinges 252 when the storage panel 250 is in the horizontal axis hinge 252 configuration. A latch 256 is provided on the storage panel 250 to secure the storage panel 250 when in the closed position. To stop the storage panel 250 at the open position in the horizontal hinge 252 configuration, a support member 258 (e.g. a support cable) is provided as shown at FIG. 14. A first end of the support member 258 is attached to the swing frame 300. A second end of the support member 258 is terminated by a ring terminal 260. A hook 262 is provided on the storage panel 250. The ring terminal 260 is preferably attached to the hook 262 when the storage panel 250 is in the horizontal hinge 252 configuration. Other embodiments may provide other means to provide a horizontally and a vertically hinged mount for the storage panel 250. Other embodiments may provide other means for stopping and latching the storage panel 250.

Figure 18:
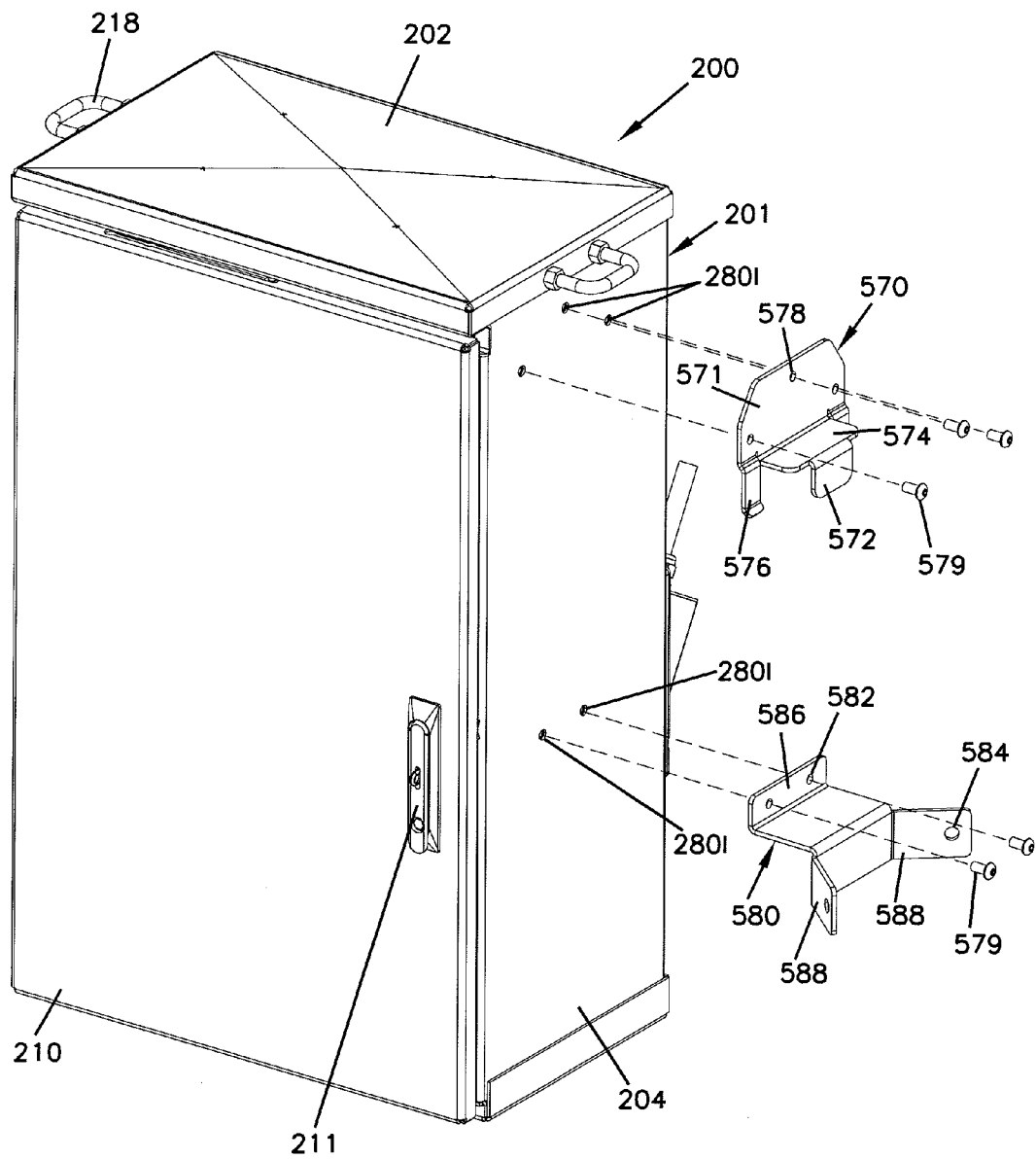
FIG. 18 is a partially exploded perspective view showing the front, top, and left side of the example fiber distribution hub of FIG. 3 and a set of mounting brackets configured on the left side.
Figure 19:
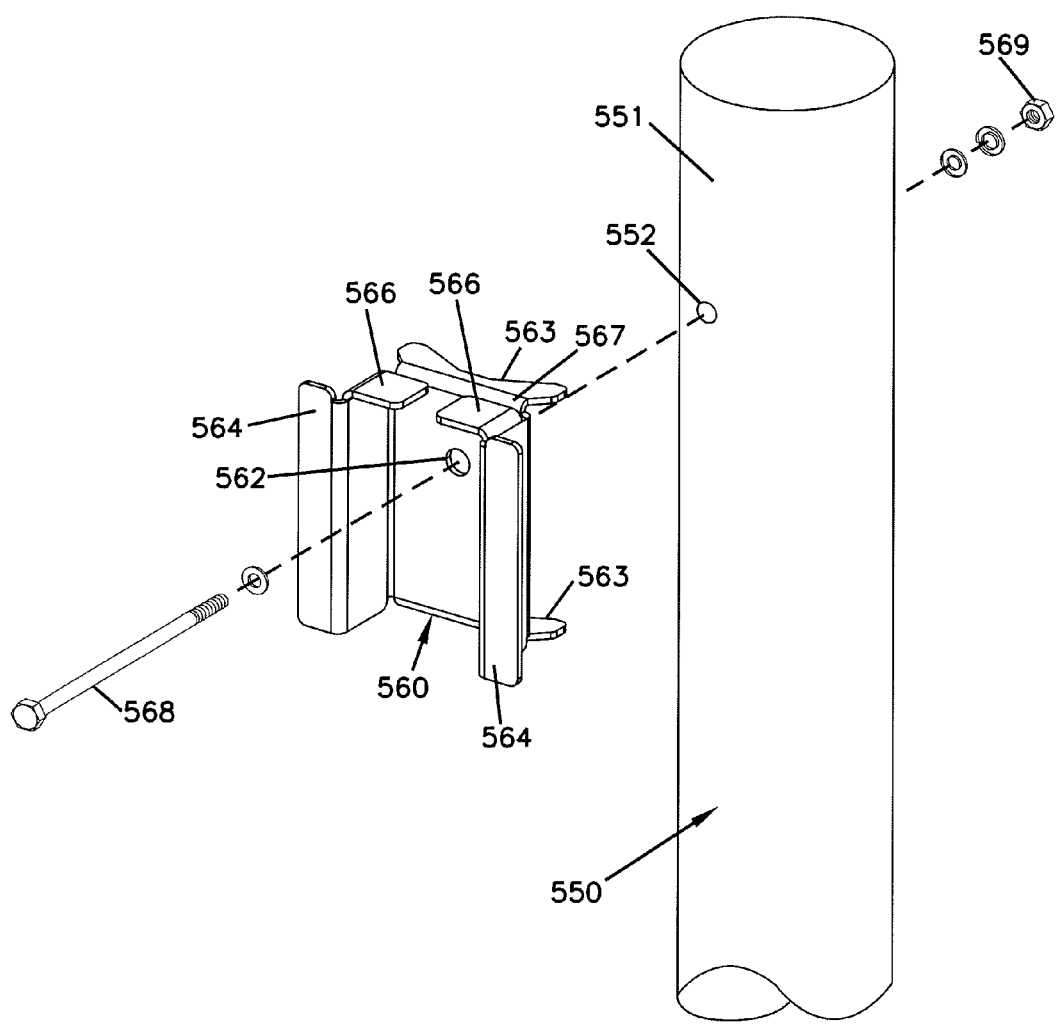
FIG. 19 is an exploded perspective view showing a front, top, and left side of a mounting pole including a mounting bracket receiver.
Figure 20:
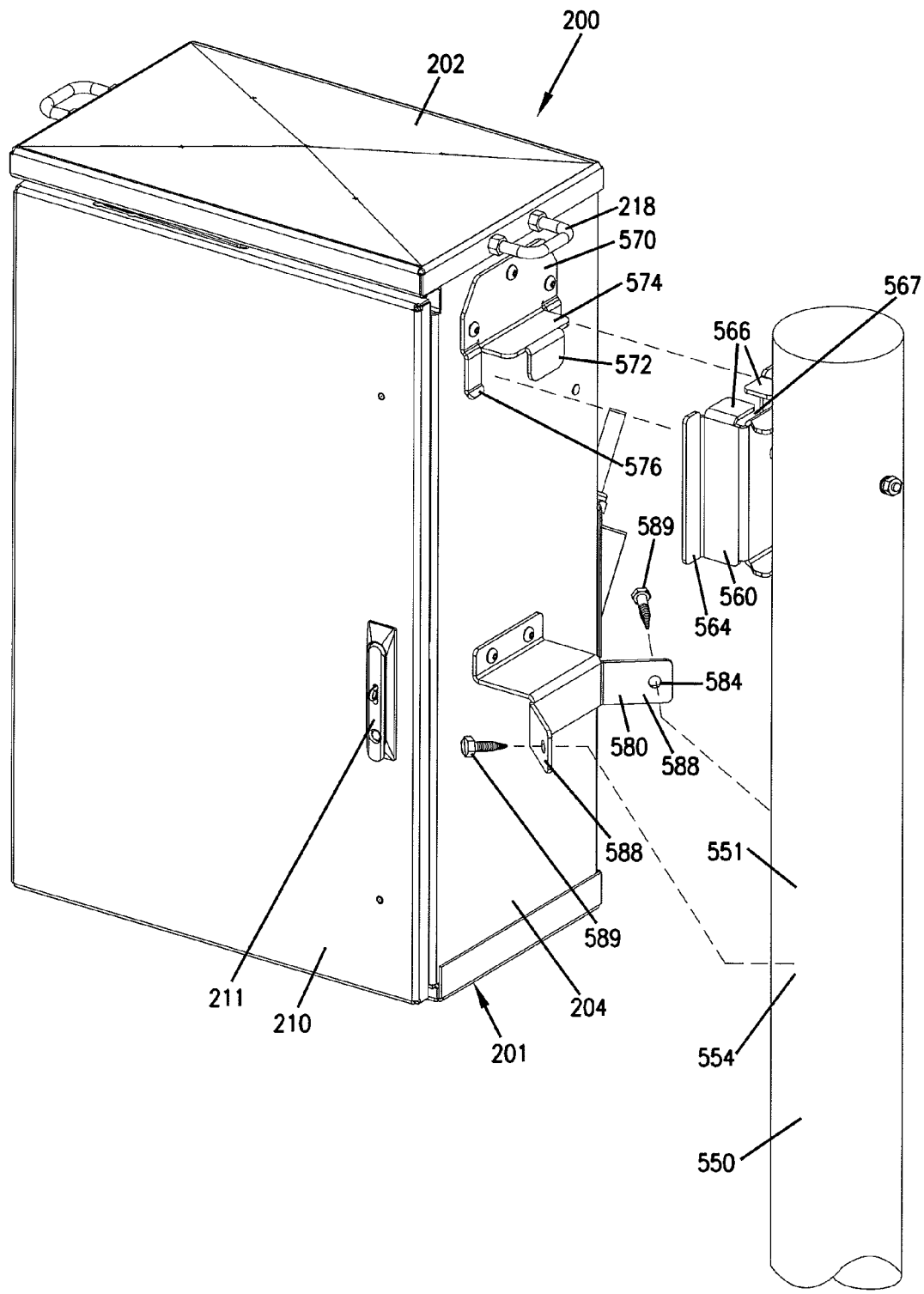
FIG. 20 is a partially exploded perspective view showing the front, top, and left side of the example fiber distribution hub of FIG. 3 with the set of mounting brackets of FIG. 18 installed and mounted to the mounting pole of FIG. 19 in a left mounting configuration.

Turning now to FIGS. 16 through 20, an example FDH mounting system is illustrated for mounting the FDH 200 to a mounting pole 550 in three configurations. The three configurations correspond with the three sets of mounting holes 280*b*, 280*l*, and 280*r*, provided on the example FDH cabinet 201 as mentioned above. A clip plate 570 and a bottom bracket 580 are fastened to one of the three sets of mounting holes 280*b*, 280*l*, or 280*r*. If a back panel 205 mounting configuration is desired, the mounting hole set 280*b* is used. Likewise, the mounting hole set 280*r* is used for a right side panel 206 mounting configuration and mounting hole set 280*l* is used for a left side panel 204 mounting configuration. FIGS. 18 and 20 illustrate the left side panel 204 mounting configuration with the clip plate 570 fastened through mounting holes 578, provided at a mounting flange 571, with mounting fasteners 579 at an upper three of the mounting holes of the set 280*l*. Additionally, the bottom bracket 580 is fastened through mounting holes 582, provided at a cabinet mounting flange 586, with additional mounting fasteners 579 at a lower two of the mounting holes of the set 280*l*.

According to the above example FDH mounting system, the mounting pole 550 is prepared to receive the FDH 200 by attaching a pole mounting bracket 560 to the pole 550 as illustrated at FIG. 19. In a preferred embodiment, a thru hole 552 is prepared on the pole 550 and a thru fastener 568 is inserted through a mounting hole 562, provided on the bracket 560, and the thru hole 552. A nut 569 retains the thru fastener 568 and is tightened, drawing an upper and a lower pole cradle 563 of the bracket 560 toward the pole 550. The pole cradles 563 are shaped to engage an outer surface 551 of the pole 550 thereby preventing rotation of the pole mounting bracket 560. The pole mounting bracket 560 further includes a pair of clip support flanges 566 and a pair of cabinet support flanges 564 to engage and support the FDH cabinet 201 with the attached clip plate 570, further described below.

FIG. 20 illustrates a mounting method that mounts the FDH 200 to the mounting pole 550. The FDH 200 with the clip plate 570 and the bottom bracket 580 pre-assembled, as described above, may be hung from the mounting pole 550 with the pole mounting bracket 560 pre-assembled, also described above. Hanging the FDH 200 from the mounting pole 550 does not require installing fasteners but instead relies on a clip tab 572 of the clip plate 570 being inserted within a clip slot 567 defined on the pole mounting bracket 560. The clip tab 572 and clip slot 567 act in conjunction with a pair of retaining fingers 576 that engage the cabinet support flanges 564. The retaining fingers 576 may be spring loaded providing a tight, rattle free connection by squeezing the cabinet support flanges 564 against the cabinet 201. In addition, the hanging relies on a pair of pole mounting flanges 588, which form a saddle shape (e.g., a "V" shape) on the bottom bracket 580, engaging the outer surface 551 of the mounting pole 550 and a stop pad 574 on the clip plate 570 engaging a pair of clip support flanges 566 on the pole mounting bracket 560. In particular, the FDH 200 is raised such that the bottom of the attached clip tab 572 is positioned above the clip slot 567 and the outer surface 551 of the mounting pole 550 is nestled within the "V" shape of the pair of the attached pole mounting flanges 588. Such a position is the clip tab 572 engagement position. The "V" shape may radially guide the FDH 200 into a radial engagement position about the mounting pole 550. As mentioned above, the loops 218 are provided to facilitate raising the FDH 200 by a crane. The crane position may be adjusted to move the FDH 200 into a vertical engagement position. A tangential engagement position of the FDH 200 may be obtained with lateral movements of the crane or, if near the clip tab 572 engagement position, manual force may be used. Once the clip tab 572 engagement position has been reached, the FDH 200 is lowered, resulting in the clip tab 572 engaging the clip slot 567. The FDH 200 is further lowered until the stop pad 574 on the clip plate 570 rests against the clip support flanges 566 on the pole mounting bracket 560. Upon the stop pad 574 resting on the clip support flanges 566, the FDH 200 is in a stable hanging position on the mounting pole 550 without additional fasteners. A tipping moment is created by an offset between a center of gravity of the FDH 200 and vertical support at the stop pad 574. The tipping moment is balanced by a lateral support, provided by the clip slot 567, pulling the FDH 200 towards the mounting pole 550 coupled by another lateral support, provided by the mounting pole 550, pushing the FDH 200 away at the bottom bracket 580. The pushing action between the mounting pole 550 and the bottom bracket 580 occurs at the "V" shape of the pair of pole mounting flanges 588, stabilizing the FDH 200. Lowering the FDH 200 into the stable position, without the immediate need for fasteners, simplifies the mounting of the FDH 200 onto the mounting pole 550, as it is difficult to both position the FDH 200 on the mounting pole 550 and simultaneously install fasteners.

After the FDH 200 is hung from the mounting pole 550, as described above, a pair of pole fasteners 589 is inserted through a pair of pole mounting holes 584, provided at the pair of pole mounting flanges 588, and screwed into the mounting pole 550 at a pair of screw locations 554. The pair of pole fasteners 589 prevents the bottom bracket 580 from separating from the mounting pole 550 during disturbances such as a wind storm. In addition, when assembled as described above, the pole mounting fasteners prevent the clip tab 572 from being pulled out of the clip slot 567 and the retaining fingers 576 from being pulled off of the cabinet support flanges 564.

Figure 29:
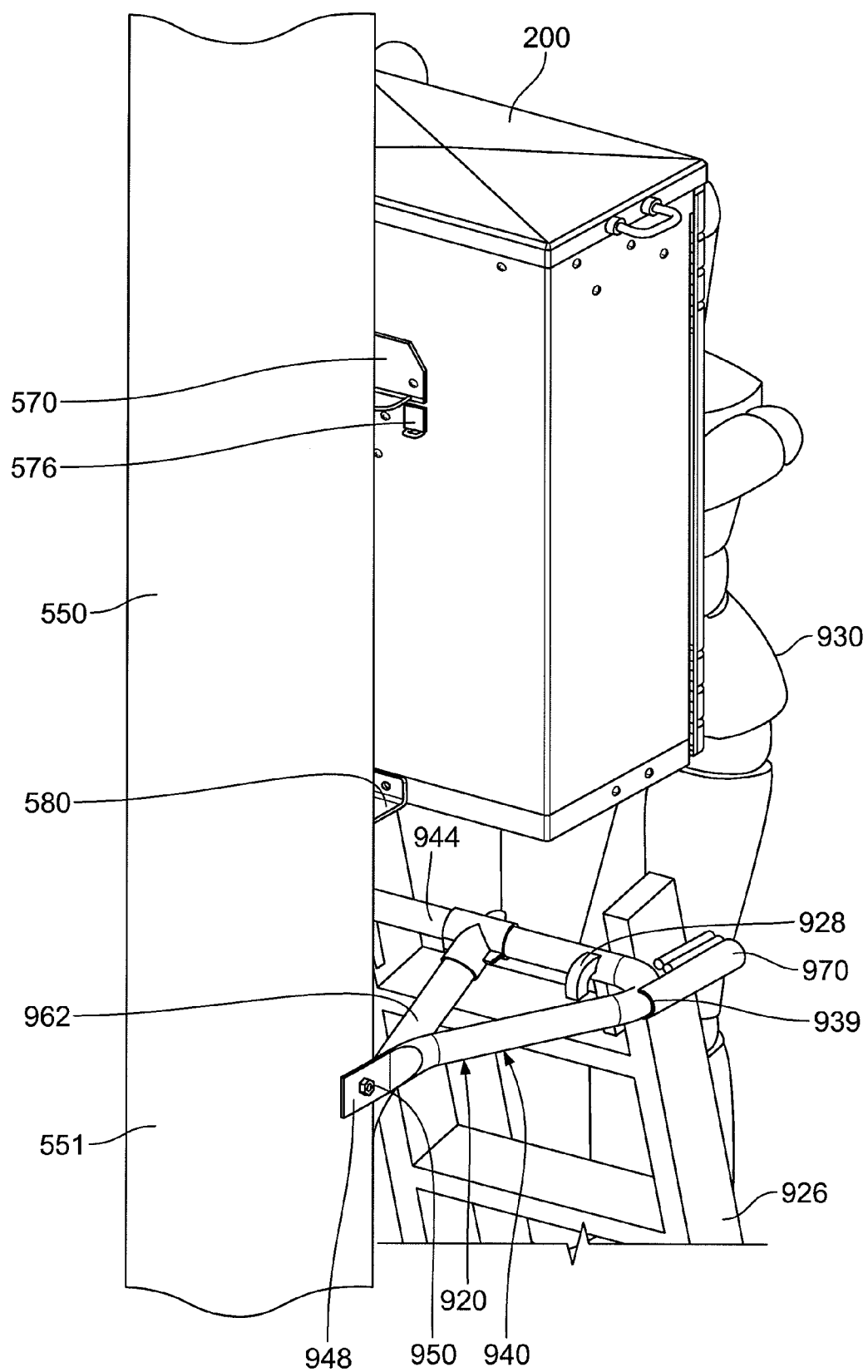
FIG. 29 is a perspective view showing the rear, the top, and the right side of the example fiber distribution hub of FIG. 3 mounted on the pole of FIG. 19 in a rear mounting configuration and a ladder bracket also mounted to the pole beneath the fiber distribution hub.
Figure 30:
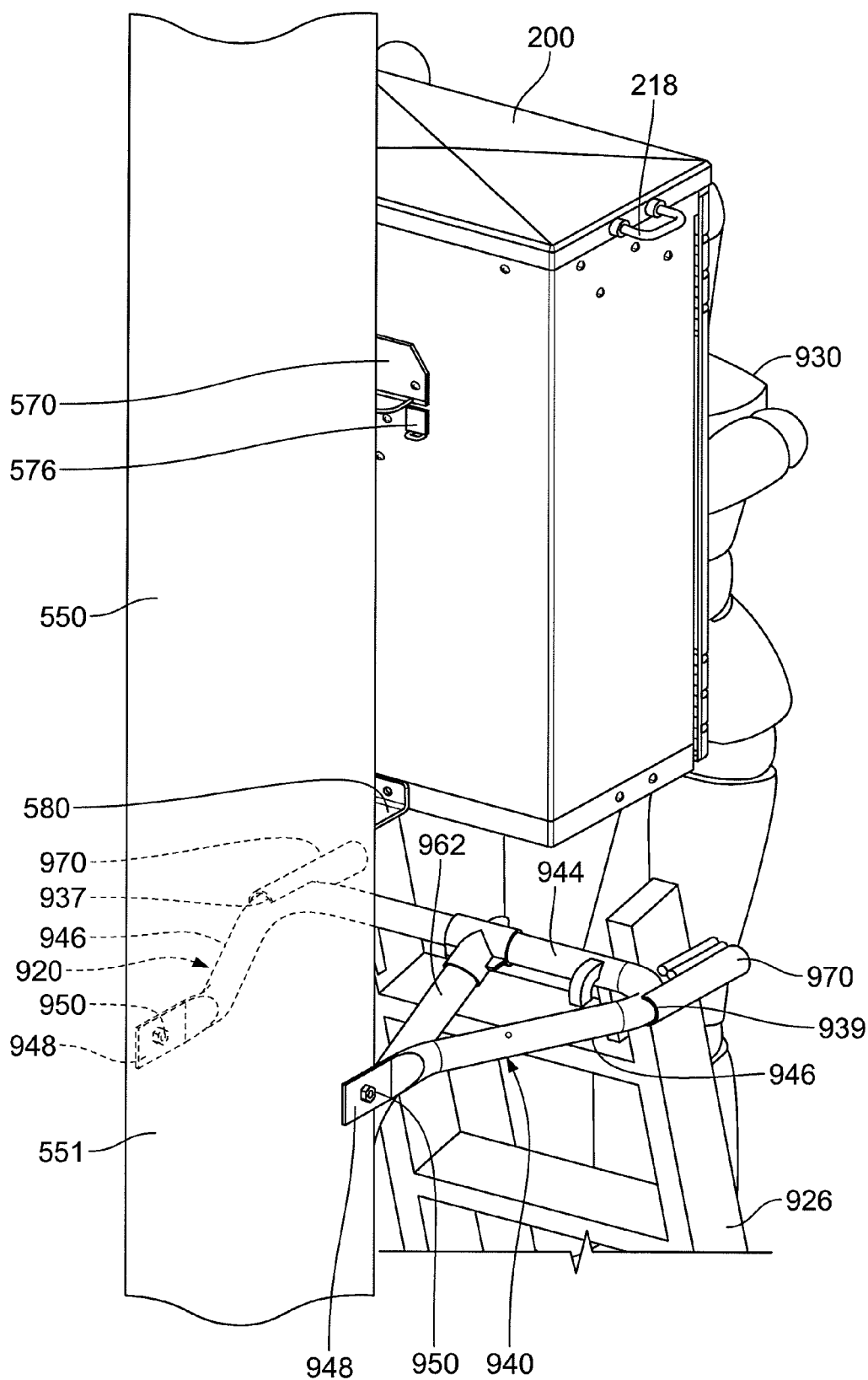
FIG. 30 is the same view as FIG. 29 but shows an upper component of the ladder bracket through the pole.
Figure 31:
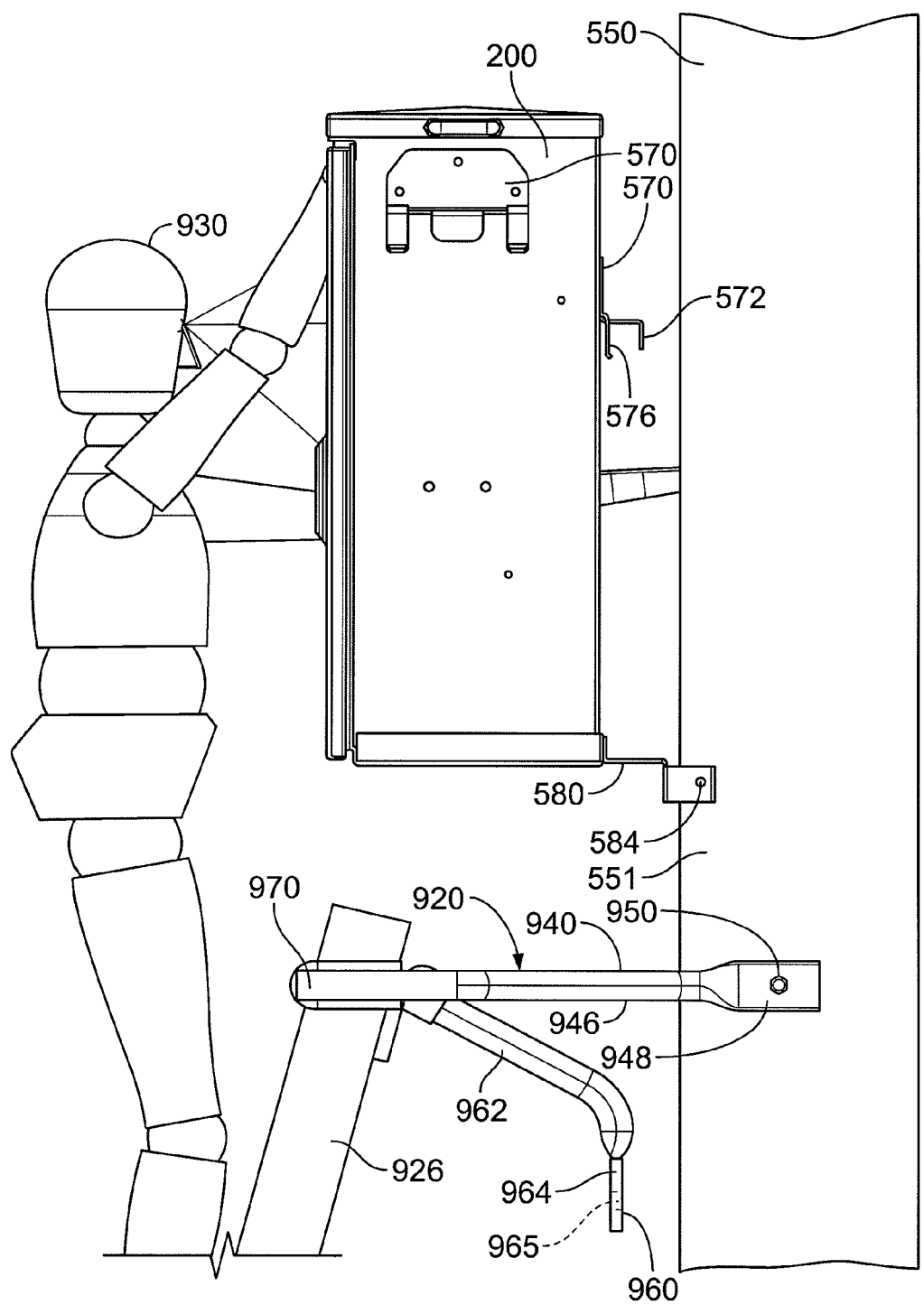
FIG. 31 is an elevation view showing the left side of the example fiber distribution hub of FIG. 3 mounted on the pole of FIG. 19 in the rear mounting configuration and the ladder bracket of FIG. 29 also mounted to the pole beneath the fiber distribution hub.
Figure 32:
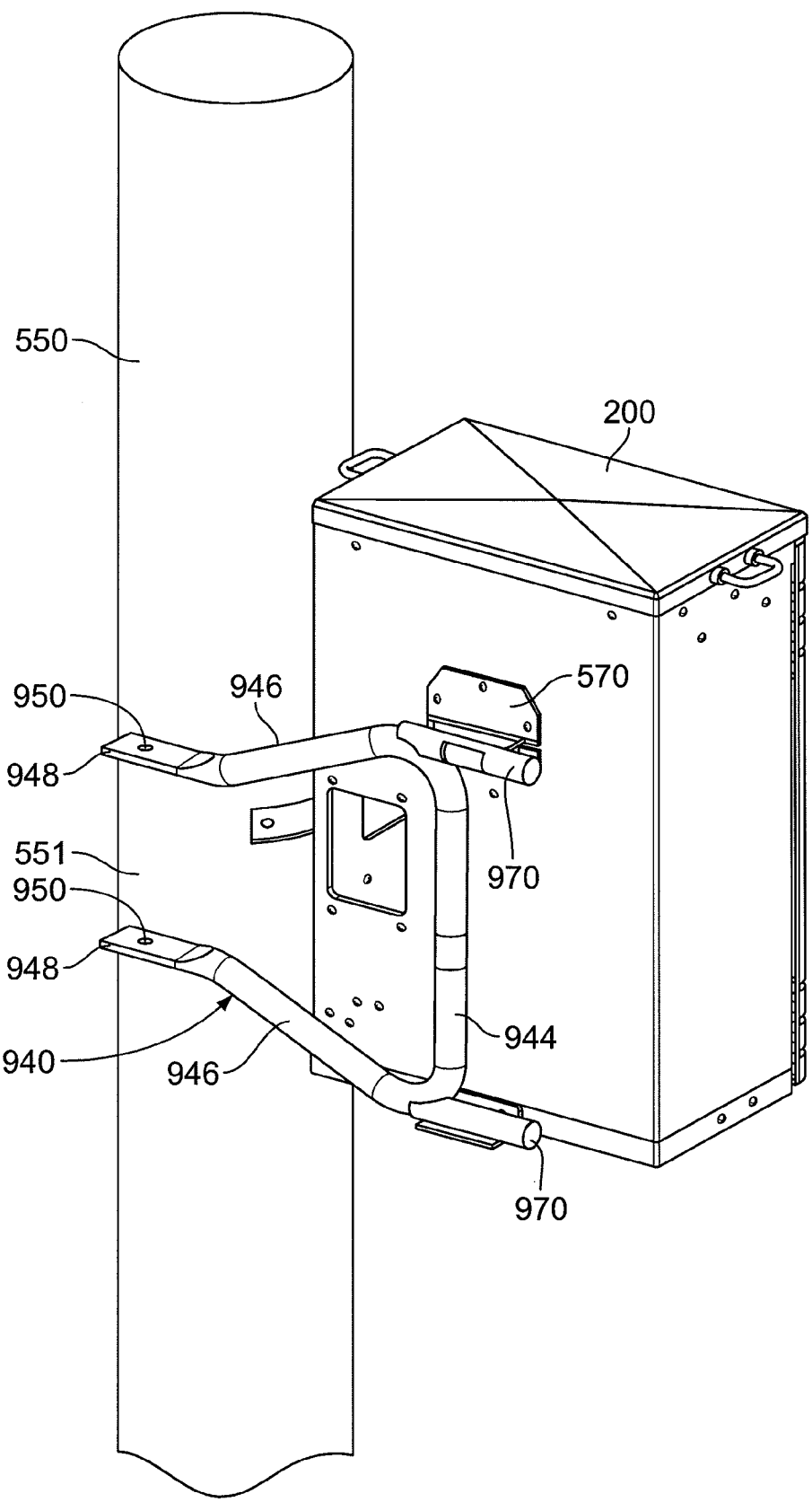
FIG. 32 is a perspective view showing the rear, top, and right side of the example fiber distribution hub of FIG. 3 mounted to the mounting pole of FIG. 19 in a left mounting configuration and the ladder bracket of FIG. 29 serving as a support bracket.
Figure 33:
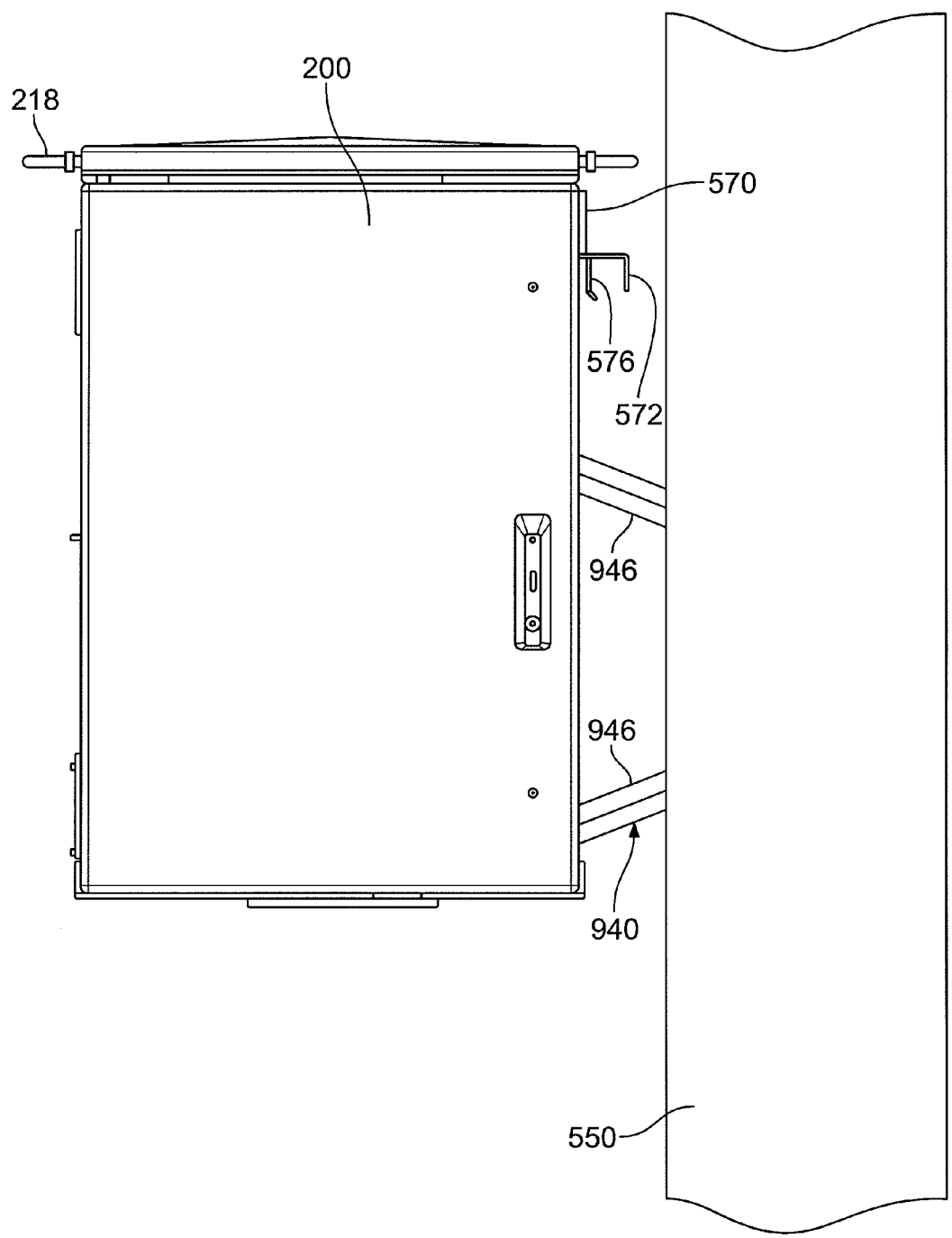
FIG. 33 is an elevation view showing the front of the example fiber distribution hub of FIG. 3 mounted to the mounting pole of FIG. 19 in a left mounting configuration and the ladder bracket of FIG. 29 serving as a support bracket.

In certain embodiments of the present disclosure a ladder bracket 920 is provided and can serve several functions as illustrated at FIGS. 29 through 33. The ladder bracket 920 may be mounted in several configurations depending on the mounting location and the mounting configuration of the FDH 200. FIGS. 29 through 31 illustrate the FDH 200 mounted on the mounting pole 550 in the back panel 205 mounting configuration and the ladder bracket 920 serving as a ladder 926 support. In contrast, FIGS. 32 and 33 illustrate the FDH 200 mounted on the mounting pole 550 in the left side panel 204 mounting configuration and the ladder bracket 920 (with certain parts removed) serving as an FDH 200 mounting bracket. In the example embodiment of FIGS. 32 and 33, an upper component 940 of the ladder bracket 920 may support the FDH 200 and connect the FDH 200 to the pole 550 with the FDH 200 in the left side panel 204 mounting configuration or the right side panel 206 mounting configuration. This support and connection may be in conjunction with the brackets 560, 570, and 580 of the preceding paragraphs or may be with the ladder bracket 920 (or component thereof) acting alone.

Referring now to FIGS. 29 through 31 the ladder bracket 920 is shown mounted to the pole 550 (e.g., a telephone pole) at a location beneath the FDH 200. A ladder 926 is shown supported by the ladder bracket 920. For example, an upper hook 928 of the ladder 926 is shown hooked over the ladder bracket 920. Lateral guide posts 970 can be included with the ladder bracket 920 to keep the ladder 926 from laterally slipping off the ladder bracket 920. The lateral guide posts 970 are especially useful in preventing a ladder without upper hooks 928 from slipping laterally off of the ladder bracket 920. A servicing technician 930 is shown standing on the ladder 926 at a position suitable for accessing the interior of the FDH 200.

Referring to FIG. 30, the ladder bracket 920 includes the generally U-shaped upper component 940 and an angled support component 962. The upper component 940 includes a central rung portion 944 over which the hooks 928 of the ladder 926 can be hooked. The central rung portion 944 can also provide support for the ladder 926 directly and also can support a ladder without hooks 928. The upper component 940 includes first and second ends 937 and 939. The upper component 940 also includes rearward extensions 946 (e.g., legs, members, struts, bars, rods, etc.) having forward ends connected to the first and second ends 937 and 939 of the central rung portion 944 and rearward ends that are rearwardly offset from the central rung portion 944. Lateral flanges 948 are positioned at the rearward ends of the rearward extensions 946. The lateral flanges 948 define openings 950 for receiving fasteners used to secure the flanges 948 to opposite sides of the pole 550. For example, as shown at FIG. 30, the flanges 948 shown positioned at opposite sides of the pole 550 such that the pole 550 is positioned directly between the lateral flanges 948 (i.e., rearward extensions 946 straddle the pole 550). Example fasteners suitable for securing the flanges 948 to the pole 550 include lag bolts.

Referring again to FIGS. 29 through 31, the angled support component 962 is adapted for reinforcing the upper component 940 such that the upper component 940 is held in a generally horizontal orientation. The angled support component 962 extends downwardly from the upper component 940 and is preferably aligned at an acute angle relative to the upper component 940. In certain embodiments, the angled support component 962 can be pivotally moveable relative to the upper component 940 (e.g., through the use of pivot bearings, T-collars or other structures) such that the angular relation between the upper component 940 and the angled support component 962 can be adjusted during installation. The angled support component 962 includes a base end 960. In certain embodiments, a forward end of the angled support component 962 is secured to the central portion 944 of the upper component 940. The base end 960 of the angled support component 962 is attached to a lower flange 964. The lower flange 964 includes one or more fastener openings 965 for allowing the flange 964 to be fastened to the pole 550. If necessary, a spacer (not shown) may be inserted between the lower flange 964 and the pole 550. For example, as shown at FIGS. 30 and 31, the lower flange 964 is secured to a front side of the pole 550, and the flanges 948 are secured to left and right sides of the pole 550. In certain embodiments, the lower flange 964 is secured to the pole 550 by fasteners such as lag bolts.

As shown at FIGS. 30 and 31, when the ladder bracket 920 is mounted beneath the fiber distribution hub 200, the central rung portion 944 is preferably located below the fiber distribution hub 200 and forwardly offset from the pole 550.

Referring now to FIGS. 32 and 33, the ladder bracket 920 is shown in a configuration serving as one of the FDH 200 support brackets. In the example configuration shown, the lateral flanges 948 of the ladder bracket 920 are near the pole 550 and can be joined to the pole 550 by suitable combinations of fasteners and/or brackets (e.g., angle brackets). The central portion 944 and the lateral guide posts 970 of the upper component 940 are near the center of the back panel 205 of the FDH cabinet 201. In the example embodiment illustrated in FIG. 32, the clip plate 570 attaches to the lateral guide posts 970 between the retaining fingers 576 and the clip tab 572 (see FIG. 18). In other embodiments, fasteners are used to secure the ladder bracket 920 to the FDH cabinet 201. The angled support component 962 has been removed from the embodiment illustrated in FIG. 32. In other embodiments, the angled support component 962 can remain attached and can serve as a third attachment point to the pole 550 (the pole 550 being cradled between the lateral flanges 948 and the base end 960). By providing a ladder bracket 920 that is suited for several purposes and mountable in several configurations, the FDH 200 can be further tailored to a variety of specific applications.

Turning now to FIGS. 22 through 28, the door stay assembly 230, mentioned above, and related features are illustrated in a preferred embodiment. The door stay assembly 230 in cooperation with a pivot mount 233, fixedly attached to the FDH cabinet 201 (see FIG. 25), and a door holding slot 240, included within the FDH cabinet door 210, function to stop and hold the door 210. In particular, a first end 232 of the door stay assembly 230 is rotatably mounted at the pivot mount 233. A second end 234 of the door stay assembly 230 is slidably mounted along the door holding slot 240. The first end 232 and the second end 234 of the door stay assembly 230 may both be formed in and joined by a bar 238 (see FIG. 26). As the cabinet door 210 is opened (i.e., moved from a shut position to an unshut position) and closed (i.e., moved from an unshut position to the shut position), the door stay assembly 230 moves in a predetermined manner, guided by the pivot mount 233 and the door holding slot 240. One or more stop positions 244 are included along the door holding slot 240. The stop positions 244 engage certain features mounted on the second end 234 of the door stay assembly 230 automatically as the second end 234 slides along the door holding slot 240. This engagement stops and holds the second end 234 at the given stop position 244 preventing further sliding until the engagement is released. By preventing sliding of the second end 234 of the door stay assembly 230 along the door holding slot 240, the cabinet door 210 is also stopped and held.

Various methods may be employed to rotatably mount the door stay assembly 230 at the pivot mount 233. For example, a bearing mount may be used. In a preferred embodiment, a pivot hole 235 is provided at the first end 232 of the door stay assembly 230 (see FIG. 28). The pivot hole 235 is mounted around a sleeve 231 of the pivot mount 233. The pivot mount 233 further captures and retains the first end 232 of the door stay assembly.

Various methods may be employed to provide engagement between the second end 234 of the door stay assembly 230 and the stop position(s) 244 along the door holding slot 240. For example, magnets or mechanical detents may serve as stop positions. In a preferred embodiment, a slide mount 245 includes a mounting flange 249 fixedly mounted to an opening 236 on the second end 234 of the door stay assembly 230 (see FIGS. 26 through 28). The slide mount 245 further includes a sliding diameter 246 positioned between an engaging diameter 247 and a retaining flange 248. The sliding diameter 246 is sized to slide along and within a guide slot portion(s) 242 of the door holding slot 240. The engaging diameter 247 is sized larger than a width of the guide slot portion(s) 242 and smaller than the stop position(s) 244 of the door holding slot 240. The retaining flange 248 is sized larger than both the width of the guide slot portion(s) 242 and the stop position(s) 244 of the door holding slot 240. The slide mount 245 is therefore slidingly held by the guide slot portion(s) 244 along its length and retains the door stay assembly 230 to the door holding slot 240.

Upon opening the cabinet door 210, the slide mount 245 is initially held by and slides within a first guide slot portion 242. Continuing to open the cabinet door 210 further slides the slide mount 245 along the first guide slot portion 242 until it reaches a first stop position 244 along the door holding slot 240 (see FIG. 25). An intermediate open position of the cabinet door 210 is held when the slide mount 245 engages the first stop position 244. As mentioned above, the engaging diameter 247 is sized smaller than the stop position(s) 244. Therefore, upon reaching the first stop position 244, gravity pulls the door stay assembly 230 down causing the engaging diameter 247 to occupy the first stop position 244. This occupation effectively engages the second end 234 of the door stay assembly 230 and the stop position 244 along the door holding slot 240. To disengage, the door stay assembly 230 may be manually lifted, raising the engaging diameter 247 out of the stop position 244. To prevent gravity from reengaging upon release of the door stay assembly 230, the cabinet door 210 may be moved slightly causing the slide mount 245 to move off of the stop position 244. If the cabinet door 210 is opened beyond the intermediate open position to a fully open position, the fully open position of the cabinet door 210 is held when the slide mount 245 engages the second stop position 244 at an end of the door holding slot 240 (see FIGS. 24 and 25).

In certain embodiments, methods not relying on gravity may be used to engage the stop position 244 and the engaging diameter 247. For example, the bar 238 may be spring loaded and urge such engagement.

The FDH cabinet door 210 stop and hold features described above are especially useful in conjunction with the ladder bracket 920 also described above. It is often desired for the servicing technician 930 to be able to remain in the same position on the ladder 926 while servicing the FDH 200. By controlling and limiting the door 210 opening position, the door 210 remains within convenient reach of the servicing technician 930 while on the ladder 926 held in position by the ladder bracket 920 (see FIG. 31).

In the above disclosure, the hinges, including the hinges 214, 252, and 355, include hinges with simple hinging lines, flexible hinging members, hinges not having simple hinging lines, hinges having pivoting members, hinges having linkages, etc. The hinging axis or axes of such hinges can have a fixed position with respect to the hinge or have a non-fixed position. In hinges including flexible members and linkages, the hinging axis does not necessarily coincide with a physical feature of the hinge and can be a virtual axis that varies in position as the hinge moves through its range of motion.

The above specification provides examples of how certain inventive aspects may be put into practice. It will be appreciated that the inventive aspects may be practiced in other ways than those specifically shown and described herein without departing from the spirit and scope of the inventive aspects.

What is claimed is:

1. A fiber distribution hub comprising:
a cabinet with a first side, the cabinet including at least one door mounted on the first side;
an entrance location on the cabinet for a fiber optic feeder cable;
a swing frame mounted within the cabinet, the swing frame being moveable between a stowed position and a service position, the swing frame including a fiber termination region; and
a storage panel rotatably mounted within the cabinet, the storage panel including a connector storage module parking space, the storage panel having a first rotational mounting configuration and a second rotational mounting configuration, the storage panel being moveable between a closed position and an open position.

2. The fiber distribution hub of claim 1, wherein the first rotational mounting configuration of the storage panel results in a generally vertical orientation of a rotational mounting axis and the second rotational mounting configuration of the storage panel results in a generally horizontal orientation of the rotational mounting axis.

3. The fiber distribution hub of claim 1, further comprising at least one storage panel hinge, wherein the swing frame includes a first hinge mounting location and a second hinge mounting location, wherein the storage panel hinge rotatably mounts the storage panel to the swing frame, the storage panel hinge mounting to the swing frame at the first hinge mounting location or the second hinge mounting location, and wherein the storage panel is configured in the first rotational mounting configuration when the storage panel hinge is mounted to the swing frame at the first hinge mounting location and the storage panel is configured in the second rotational mounting configuration when the storage panel hinge is mounted to the swing frame at the second hinge mounting location.

4. The fiber distribution hub of claim 3, wherein an axis of the at least one storage panel hinge is oriented generally vertically when the storage panel hinge is attached to the swing frame at the first hinge mounting location and the axis of the at least one storage panel hinge is oriented generally horizontally when the storage panel hinge is attached to the swing frame at the second hinge mounting location.

5. The fiber distribution hub of claim 3, further comprising a stop plate, wherein the storage panel includes a first set and a second set of mounting holes, wherein the storage panel hinge is attached to the storage panel at the first set of mounting holes and the stop plate is attached to the storage panel at the second set of mounting holes when the storage panel is configured in the first rotational mounting configuration, and wherein the storage panel hinge is attached to the storage panel at the second set of mounting holes and the stop plate is attached to the storage panel at the first set of mounting holes when the storage panel is configured in the second rotational mounting configuration.

6. The fiber distribution hub of claim 2, further comprising a support member extending between a first and a second end, the first end of the support member being attached to the swing frame and the second end of the support member being attached to the storage panel, the support member supporting the storage panel when the storage panel is configured in the second rotational mounting configuration and positioned at the open position.

7. The fiber distribution hub of claim 1, further comprising a latch, the latch holding the storage panel in the closed position when the storage panel is in the closed position.

8. The fiber distribution hub of claim 7, wherein the latch is mounted on the storage panel at a latch mounting location that is the same regardless of whether the storage panel is in the first rotational mounting configuration or in the second rotational mounting configuration.

9. A fiber distribution hub comprising:
a cabinet with a first side, the cabinet including at least one door mounted on the first side;
an entrance location on the cabinet for a fiber optic feeder cable;
a swing frame rotatably mounted within the cabinet and including a fiber termination region; and
a hinged storage panel rotatably mounted along an axis within the cabinet, the hinged storage panel including a connector storage module parking space, the axis having a first configuration with a first orientation and a second configuration with a second orientation.

10. The fiber distribution hub of claim 9, wherein the first configuration of the axis results in a vertical orientation of the axis and the second configuration of the axis results in a horizontal orientation of the axis.

11. The fiber distribution hub of claim 9, further comprising a ladder bracket, the ladder bracket having a first configuration as a ladder support and a second configuration as a fiber distribution hub mounting bracket.

12. The fiber distribution hub of claim 9, further comprising a door stay, wherein the door of the cabinet is rotatably mounted to the cabinet, the door being moveable between a shut position and unshut positions, wherein the door stay releasably holds the door in at least one of the unshut positions.

13. The fiber distribution hub of claim 12, wherein the unshut positions of the door held by the door stay include an intermediate open position and a fully open position.

14. A fiber distribution hub comprising:
a cabinet with a first side, a second side, a third side, and a fourth side, the cabinet including at least one door mounted on the first side, the cabinet including a first exterior panel on the second side and a second exterior panel on the third side, the first exterior panel including a first group of mounting holes, and the second exterior panel including a second group of mounting holes;
an entrance location on the cabinet for a fiber optic feeder cable;
a swing frame rotatably mounted within the cabinet and including a fiber termination region; and
a mounting bracket set including at least one mounting bracket, the mounting bracket set attachable to either the first group or the second group of mounting holes;
wherein a first mounting configuration of the fiber distribution hub is defined when the mounting bracket set is attached to the first group of mounting holes and a second mounting configuration of the fiber distribution hub is defined when the mounting bracket set is attached to the second group of mounting holes.

15. The fiber distribution hub of claim 14, further comprising a third exterior panel on the fourth side of the cabinet, the third exterior panel including a third group of mounting holes, wherein a third mounting configuration of the fiber distribution hub is defined when the mounting bracket set is attached to the third group of mounting holes.

16. The fiber distribution hub of claim 14, wherein at least one of the mounting brackets of the mounting bracket set is slidingly received in a mounting bracket receiver, the mounting bracket receiver engaging and supporting the at least one of the mounting brackets when the at least one of the mounting brackets is fully received in the mounting bracket receiver, wherein the fiber distribution hub can be stably seated and supported at an installation location in either the first mounting configuration or the second mounting configuration by engaging the at least one of the mounting brackets and the mounting bracket receiver, and wherein stably seating the fiber distribution hub at the installation location requires no fasteners.

17. The fiber distribution hub of claim 15, wherein the fiber distribution hub can be stably seated and supported at an installation location in either the first, second, or third mounting configuration by engaging at least one of the mounting brackets and a mounting bracket receiver.

18. The fiber distribution hub of claim 16, wherein the mounting bracket set further includes a saddle bracket and the installation location includes a mounting pole, wherein the mounting bracket receiver is attached to the mounting pole, and wherein the saddle bracket includes a saddle shape adapted to radially engage the mounting pole.

19. The fiber distribution hub of claim 18, further comprising attachment fasteners, the attachment fasteners fastening the saddle bracket to the mounting pole when the fiber distribution hub is seated at the installation location, the attachment fasteners preventing disengagement of the at least one of the mounting brackets from the mounting bracket receiver.

20. The fiber distribution hub of claim 14, further comprising a door stay, wherein the door of the cabinet is rotatably mounted to the cabinet, the door being moveable between a shut position and unshut positions, wherein the door stay releasably holds the door in at least one of the unshut positions.

21. The fiber distribution hub of claim 20, wherein the unshut positions of the door held by the door stay include an intermediate open position and a fully open position.

* * * * *